US006967914B2

(12) United States Patent
Udagawa et al.

(10) Patent No.: US 6,967,914 B2
(45) Date of Patent: Nov. 22, 2005

(54) OPTICAL RECORDER AND LASER POWER CONTROL METHOD

(75) Inventors: Toshiki Udagawa, Tokyo (JP); Taro Nishiura, Tokyo (JP)

(73) Assignee: Sony Corporation, Tokyo (JP)

( * ) Notice: Subject to any disclaimer, the term of this patent is extended or adjusted under 35 U.S.C. 154(b) by 76 days.

(21) Appl. No.: 10/333,000

(22) PCT Filed: May 24, 2002

(86) PCT No.: PCT/JP02/05033

§ 371 (c)(1),
(2), (4) Date: Jul. 31, 2002

(87) PCT Pub. No.: WO02/101734

PCT Pub. Date: Dec. 19, 2002

(65) Prior Publication Data

US 2004/0013064 A1 Jan. 22, 2004

(30) Foreign Application Priority Data

May 28, 2001 (JP) ............................. 2001-158871

(51) Int. Cl.[7] ............................................. G11B 7/004
(52) U.S. Cl. ............................. 369/47.51; 369/53.22
(58) Field of Search .......................... 369/47.51, 59.11, 369/52.22, 53.3, 53.26, 53.27

(56) References Cited

U.S. PATENT DOCUMENTS 5,790,482 A * 8/1998 Saga et al. ............... 369/13.27
6,657,935 B2 * 12/2003 Eguchi et al. ............. 369/59.1
6,678,228 B1 * 1/2004 Kando et al. ............. 369/47.51

FOREIGN PATENT DOCUMENTS

JP 2000-298834 10/2000
JP 2002-109739 4/2002

* cited by examiner

Primary Examiner—William Klimowicz
Assistant Examiner—Lixi Chow
(74) Attorney, Agent, or Firm—Oblon, Spivak, McClelland, Maier & Neustadt, P.C.

(57) ABSTRACT

An optical recording apparatus obtains the most appropriate recording laser power state in real time according to an environmental mark-generation condition. When data is recorded (mark is generated) by emitting pulse-train-manner laser outputs to an organic-pigment recording medium, a first signal value corresponding to a first pulse in the pulse-train-manner laser outputs and a second signal value corresponding to second and subsequent pulses in the pulse-train-manner laser outputs are detected as a reflected-light information signal; the ratio thereof is obtained; and the obtained ratio and a reference ratio are used to generate a laser-power compensation signal to control the power of the laser outputs.

14 Claims, 17 Drawing Sheets

DC RF WAVEFORM, AVERAGE RECORDING POWER: 2.24 mW

DC RF WAVEFORM, AVERAGE RECORDING POWER: 3.27 mW

DC RF WAVEFORM, AVERAGE RECORDING POWER: 3.73 mW

DC RF WAVEFORM, AVERAGE RECORDING POWER: 4.72 mW

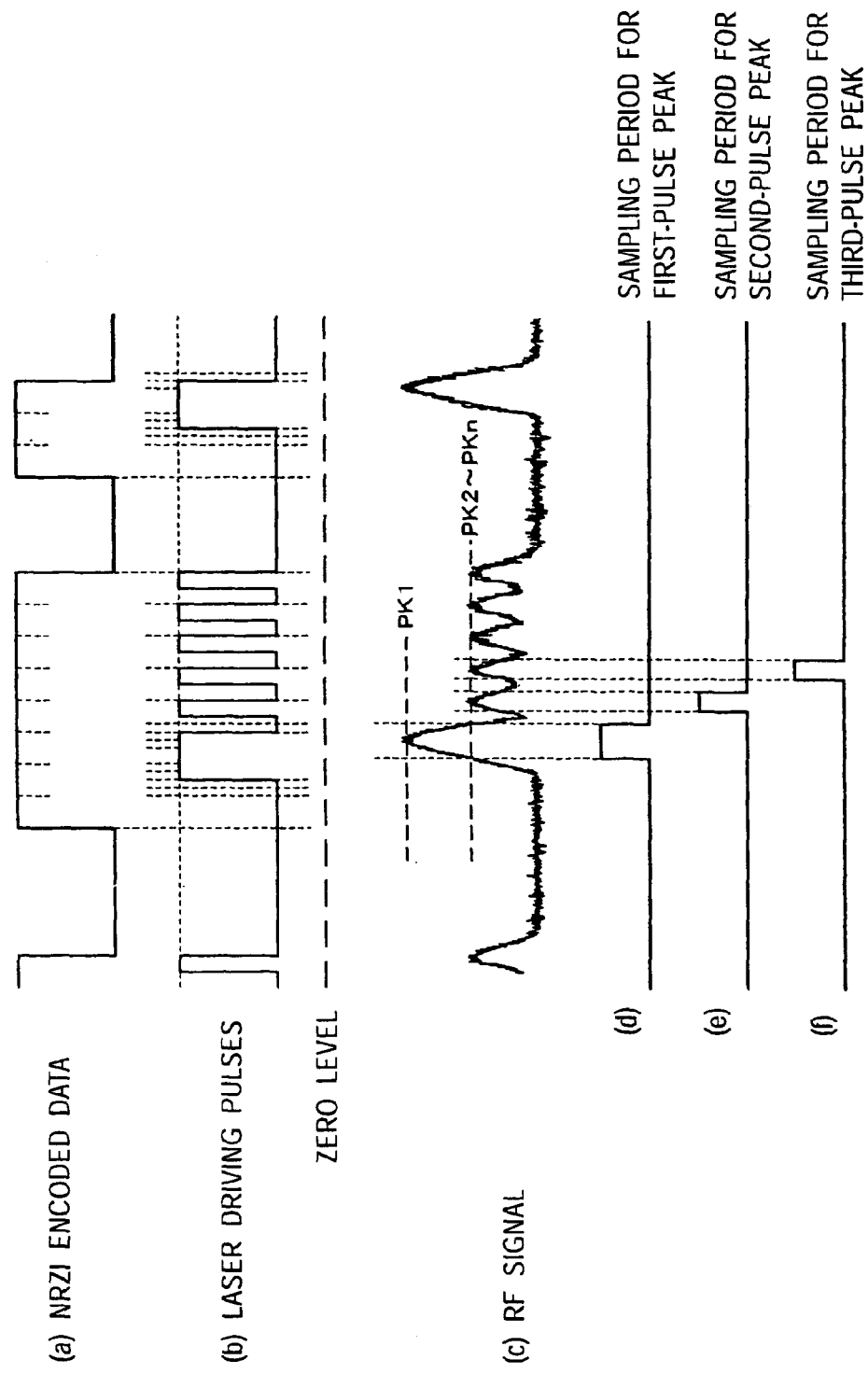

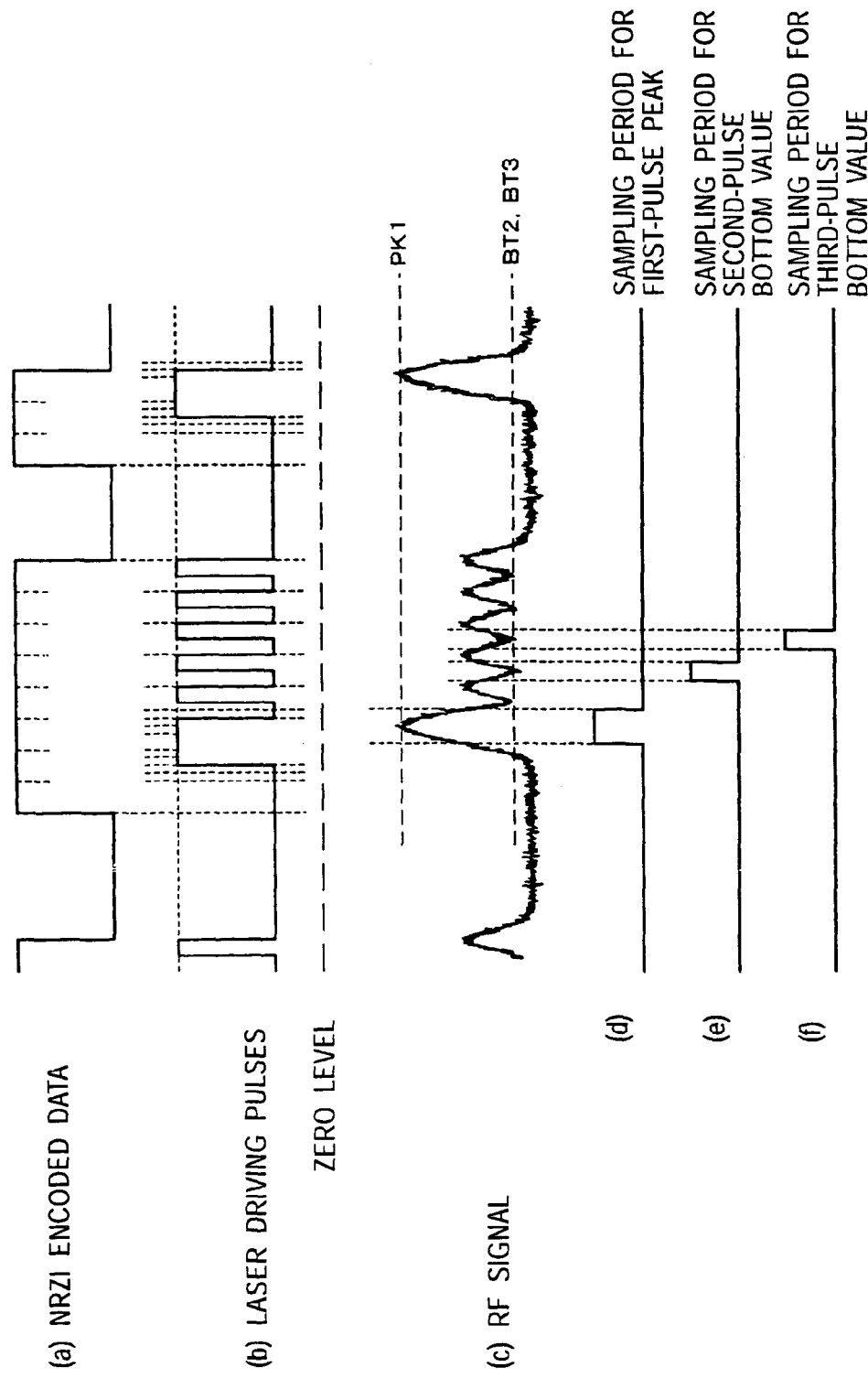

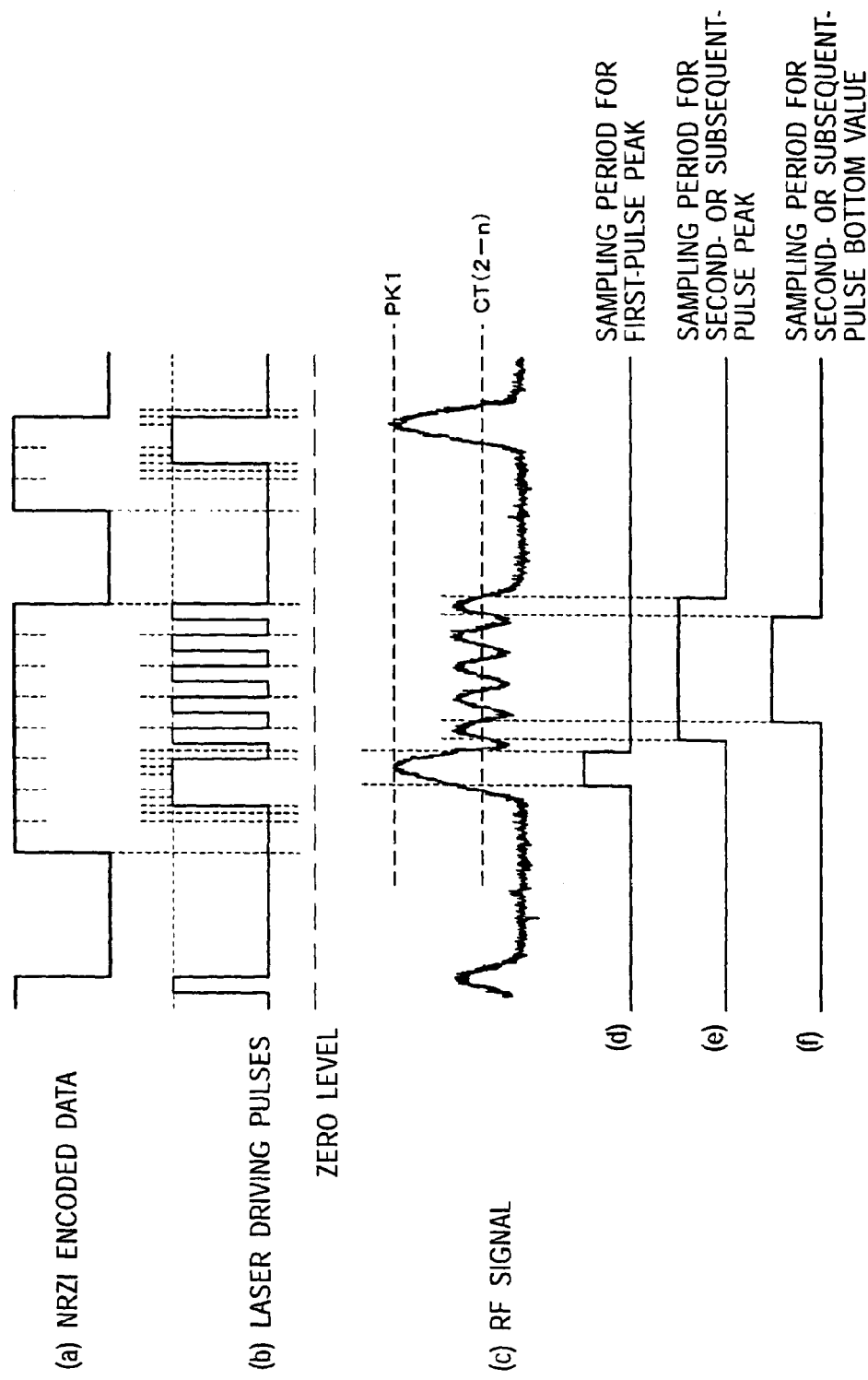

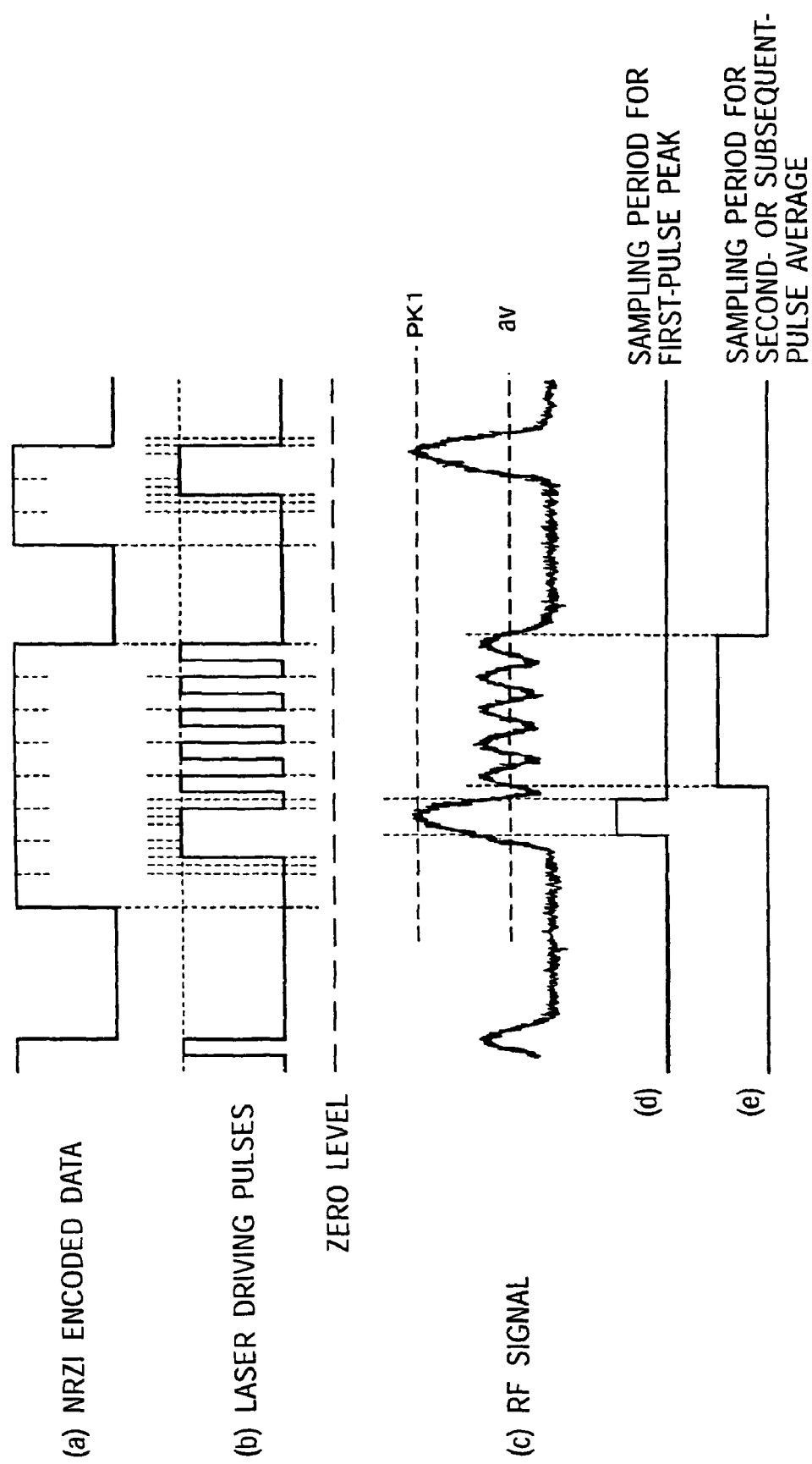

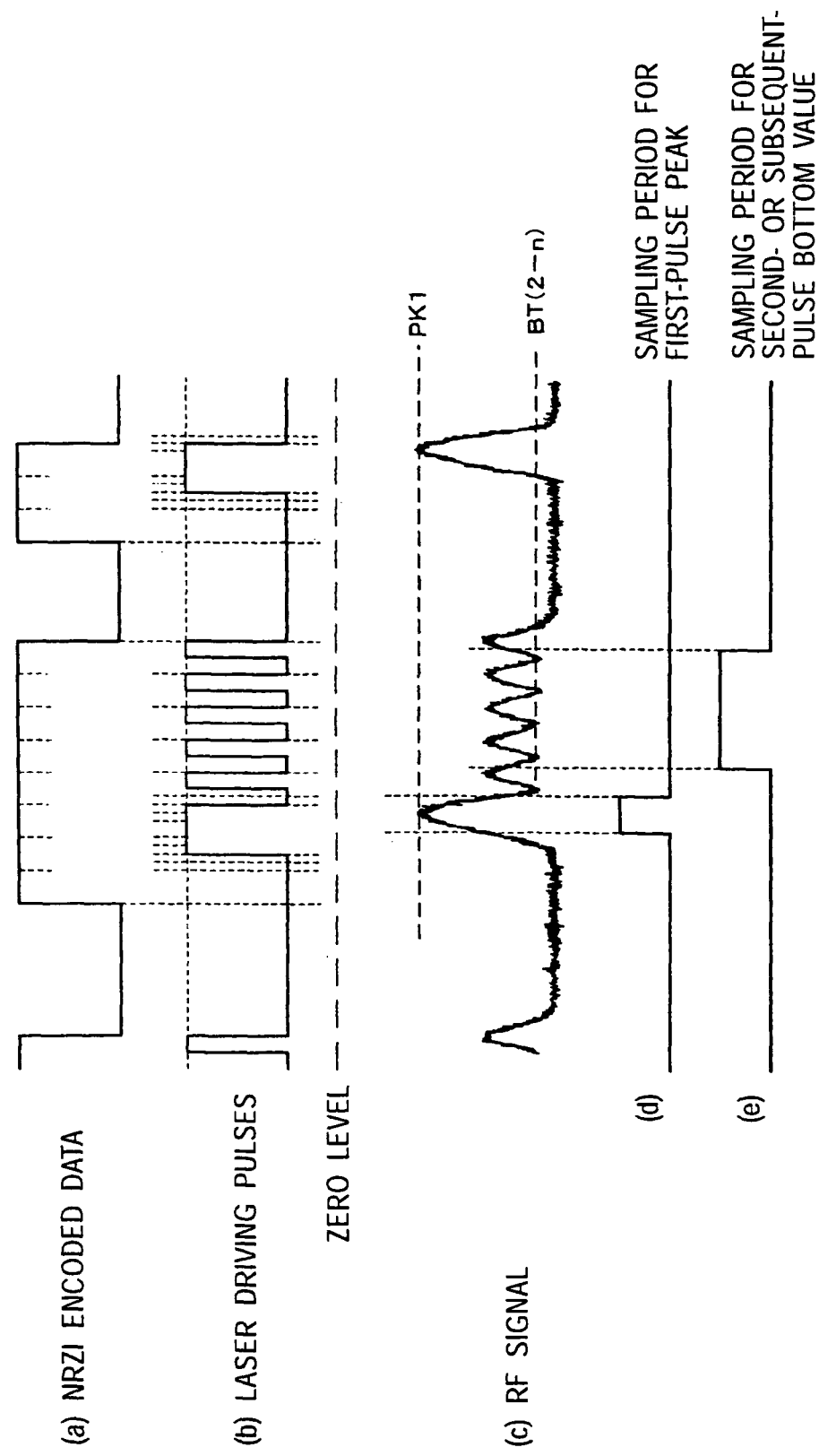

OPTICAL RECORDER AND LASER POWER CONTROL METHOD

TECHNICAL FIELD

The present invention relates to optical recording apparatuses for recording into recording media such as optical disks, and laser-power control methods.

BACKGROUND ART

CD-type and DVD-type optical disks have been widely known as optical recording media. Especially as write-once media and rewritable media, media for which data recording can be performed at a user side, and recording apparatuses have also been spread.

For example, CD-Rs (compact discs recordable) and DVD-Rs (digiral versatile discs recordable) are typically used as write-once media. In the disks, organic pigment films are used as disk recording layers, and pits (marks) are formed by organic-pigment changes when a laser is emitted to data tracks formed as pre-grooves.

When data is recorded in such recording media, if laser power is optimized, pits are successfully formed and therefore, the quality of a reproduced signal is improved when reproduction.

To this end, when an organic-pigment-film recording medium is loaded into an optical recording apparatus, or immediately before recording is started, test writing is executed several times at a predetermined area (test-writing area) of the recording medium while laser power is slightly being changed, to determine the recording laser power which makes the quality of a reproduced signal best in the area. The asymmetry or the jitter of a reproduced RF signal is, for example, used as an evaluation function to evaluate the quality of the reproduced signal.

The most appropriate laser power is obtained before a recording operation, and so-called APC (automatic laser-power control) is applied during recording to output a laser at the most appropriate power. Therefore, a successful recording operation is allowed.

However, the obtained most appropriate laser power is just for the test-writing area.

On the disk, recording-film unevenness may occur from the center to the peripheral of the disk due to a recording-film forming process in manufacturing the recording medium.

Further, the wavelength of a laser output from a semiconductor laser device generally fluctuates according to the temperature. The wavelength of the laser emitted to the surface of a recording medium changes the optical absorption efficiency of the recording medium. In other words, even if the laser output power is constant, the energy received by the recording film of the disk is changed due to a change in laser wavelength, and therefore, the state of a pit mark generated by the energy is also changed. In summary, even if the recording laser power is output at the most appropriate value, a mark to be generated may be shifted from the most appropriate mark state.

With these points being taken into consideration, the most appropriate laser power obtained by power calibration performed at the test-writing area on the disk at a point of time is not necessarily the most appropriate recording laser power for the entire area of the disk or under every environmental condition, which includes temperature changes.

In other words, even when a laser is output by an APC operation at the most appropriate laser power obtained by power calibration, this does not necessarily mean that the most-appropriate recording operation (pit forming operation which causes a high-quality reproduction signal to be obtained during reproduction) is always implemented.

When an APC operation is performed which employs only the most appropriate recording power obtained in the test-writing area as a target value, if the quality margin of a reproduced signal is taken into account in a system, it may be effective to suppress the fluctuation of the light absorption efficiency of the recording medium as much as possible, or to employ a laser driving apparatus which has a laser in which the fluctuation of the wavelength is unlikely to occur when the temperature is changed or which has a temperature control mechanism. These measures are, however, technically complicated and disadvantageous in terms of cost.

The above problem may be avoided by proposing a format in which the deterioration of reproduced-signal quality is assumed in advance. This proposal, however, leads in an opposite direction for optical recording/reproduction systems for which higher density is strongly demanded.

DISCLOSURE OF INVENTION

Under the above situation, an object of the present invention is to allow a recording operation to be always executed at the most appropriate laser power to obtain a high-quality reproduced signal.

To this end, an optical recording apparatus according to the present invention includes recording processing means for applying encoding processing to data to be recorded to generate encoded data and for generating laser driving pulses used for executing pulse-train-manner laser outputs, according to the encoded data; recording-head means for emitting the laser outputs to the recording medium according to the laser driving pulses to execute data recording; reflected-light information signal detection means for detecting a reflected-light information signal obtained when the recording-head means emits the laser outputs; signal-value detection means for detecting a first signal value corresponding to a first pulse in the pulse-train-manner laser outputs and a second signal value corresponding to second and subsequent pulses in the pulse-train-manner laser outputs, in the reflected-light information signal detected by the reflected-light information signal detection means; calculation means for obtaining the ratio of the first and second signal values detected by the signal-value detection means and for generating a laser-power compensation signal by using the obtained ratio and a reference ratio; and laser-power control means for controlling the power of the laser outputs according to the laser-power compensation signal sent from the calculation means.

In this case, the recording medium has an organic pigment film as a recording layer.

In addition, the first signal value is the peak, the center value, or the modulation value of the reflected-light information signal, corresponding to the first pulse in the pulse-train-manner laser outputs.

The second signal value is the peak, the center value, the bottom value, the average, or the modulation value of the reflected-light information signal, corresponding to the whole or a part of the second and subsequent pulses in the pulse-train-manner laser outputs.

The calculation means stores in advance the most appropriate ratio of the first and second signal values according to each of various conditions related to a recording operation, and selects a ratio suited to the current condition among the stored ratios to use it as the reference ratio.

A laser-power control method according to the present invention is for an optical recording apparatus which applies pulse-train-manner laser outputs to a recording medium having an organic pigment film to record data. A first signal value corresponding to a first pulse in the pulse-train-manner laser outputs and a second signal value corresponding to second and subsequent pulses in the pulse-train-manner laser outputs are detected in a reflected-light information signal obtained during laser outputs; the ratio of the first and second signal values detected is obtained; a laser-power compensation signal is generated by using the obtained ratio and a reference ratio; and the power of the laser outputs is controlled according to the laser-power compensation signal.

Pit marks are formed more quickly with respect to laser emission on recording media having organic pigment films than on, for example, recording media having general phase-change recording films. In other words, an effect of the pit mark being recorded by the current laser illumination appears on reflected light obtained by the laser illumination. "Pit marks are formed more quickly," described above, means that pit marks are generated so "quickly" that the pit mark being recorded changes the quantity of reflected light of the recording laser.

For such recording media, a mark-generation state can be monitored in real time by reflected-light information. Therefore, reflected-light information which includes mark-generation information is observed during recording, it is determined almost at the same time whether the recording power currently being output is most appropriate for mark generation, and if the recording power is shifted from the most appropriate state, a shift compensation is fed back to a laser-power control system to control the laser power so as to be the most appropriate state.

BRIEF DESCRIPTION OF THE DRAWINGS

FIG. 15 is a view showing another example of RF-signal sampling operations according to the embodiment.

FIG. 16 is a view showing another example of RF-signal sampling operations according to the embodiment.

FIG. 17 is a view showing another example of RF-signal sampling operations according to the embodiment.

FIG. 18 is a view showing another example of RF-signal sampling operations according to the embodiment.

FIG. 19 is a view showing another example of RF-signal sampling operations according to the embodiment.

BEST MODE FOR CARRYING OUT THE INVENTION

Figure 1:
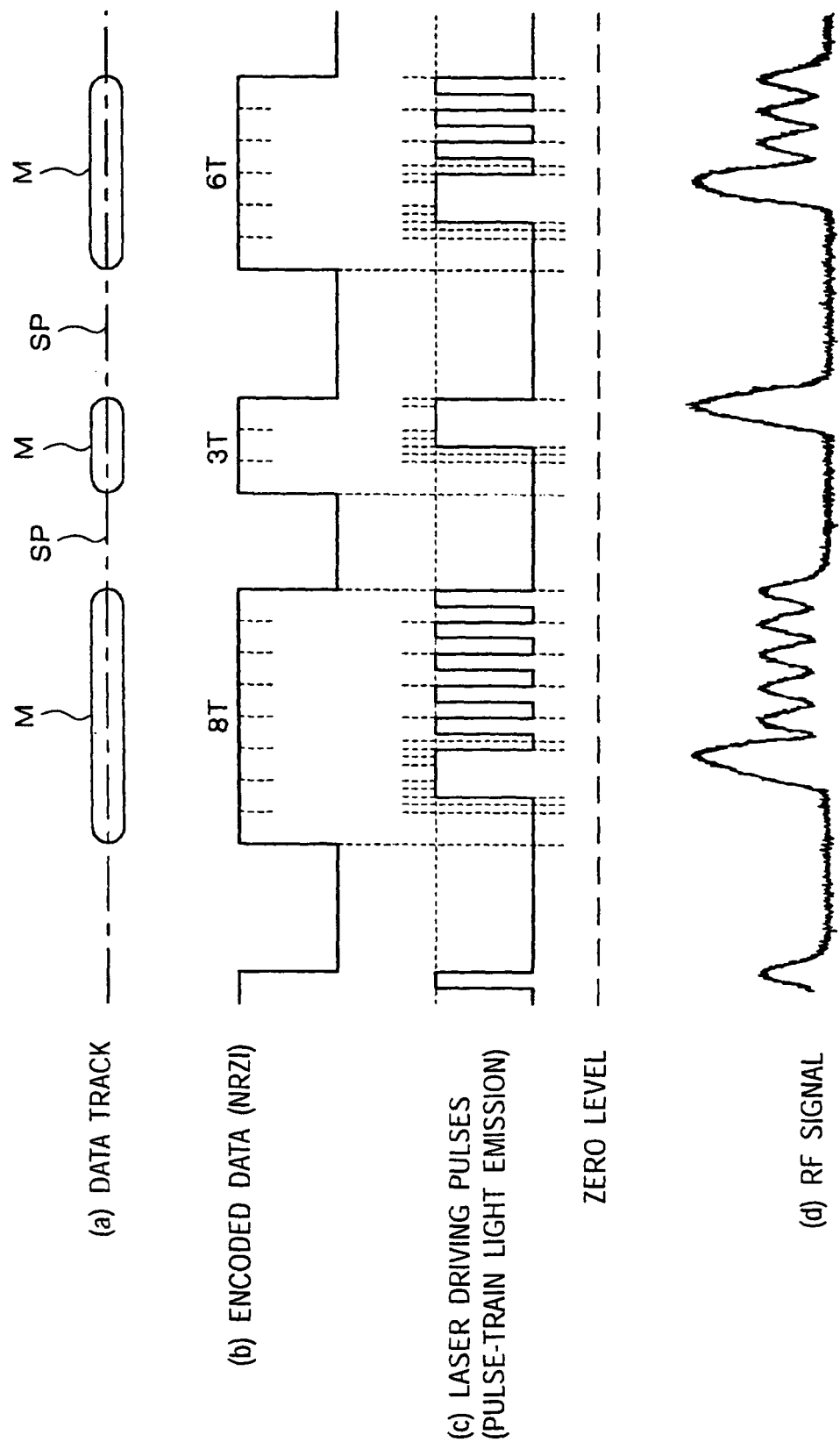
FIG. 1 is a view showing pulse-train-manner light emission driving and an RF signal according to an embodiment of the present invention.

As an optical recording apparatus and a laser-power control method according to an embodiment of the present invention, a disk drive apparatus (recording and reproduction apparatus) for DVD-Rs and its laser-power control operation will be taken as examples and described. Descriptions will be given in the following order.

1. Pulse-Train Recording Method and RF Signal
2. Structure of Disk Drive Apparatus
3. Recording Power Compensation Operation (Example 1)
4. Recording Power Compensation Operation (Example 2)
5. Various Modifications 1. Pulse-Train Recording Method and RF Signal The disk drive apparatus according to the present embodiment records and reproduces data into and from recording media having an organic pigment film, such as DVD-Rs, and emits a laser by a so-called pulse train method when recording.

A pulse-train-manner laser emission driving method used when recording and a reflected-light information signal, which is an RF signal, observed during a recording operation with laser outputs will be first described to explain the principle of laser-power control, described later, executed in the disk drive apparatus according to the present embodiment.

When recording, data to be recorded is encoded to finally generate an NRZI-method run-length-limited code.

For example, FIG. 1(a) shows a data track on a disk in a simplified manner. To form a data track having marks M and spaces SP in this way, a data stream shown in FIG. 1(b) is output from an encoding system as encoded data.

In this case, an encoded data stream which forms a 8T mark (pit), a 3T space, a 3T mark, a 4T space, and a 6T mark is indicated (where T means the unit of length corresponding to a channel bit) as an example.

For the encoded data shown in FIG. 1(b), so-called pulse-train-manner laser driving pulses like those shown in FIG. 1(c) are generated as a signal for actually executing laser outputs.

In other words, laser driving pulses (writing pulses) having a recording level are intermittently output according to the lengths of pits to be formed during a period in which marks M are formed, and laser driving pulses having a reproduction level are consecutively output during a period corresponding to spaces SP.

Various waveforms of the laser driving pulses can be considered, and this case shows just one example. In this case, a writing pulse rises about 1.5T later than when the encoded data rises, and lasts for a period of 1.5T. Then, writing pulses having a period of 0.5T continue with a period of 0.5T sandwiched by adjacent writing pulses, until the encoded data falls.

Therefore, to form an 8T mark, as shown in the figure, after a 1.5T reading level, a 1.5T writing pulse is output, and then, five 0.5T writing pulses are output with 0.5T read levels sandwiched therebetween.

To form a 6T mark, after a 1.5T reading level, a 1.5T writing pulse is output, and then, three 0.5T writing pulses are output with 0.5T read levels sandwiched therebetween.

To form a 3T mark, a 1.5T writing pulse output after a 1.5T reading level is sufficient for a 3T period, there is no subsequent 0.5T writing pulses.

Since laser output is performed by such laser driving pulses, laser power increases intermittently during pit forming periods.

When such pulse-train-manner laser outputs are performed, an RF signal detected as light reflected from the organic-pigment-film disk is as shown in FIG. 1(d).

More specifically, a first pulse has a relatively large amplitude, a second pulse has a smaller amplitude than the first pulse, and third, fourth, and subsequent pulses have almost the same amplitude as the second pulse.

Figure 2:
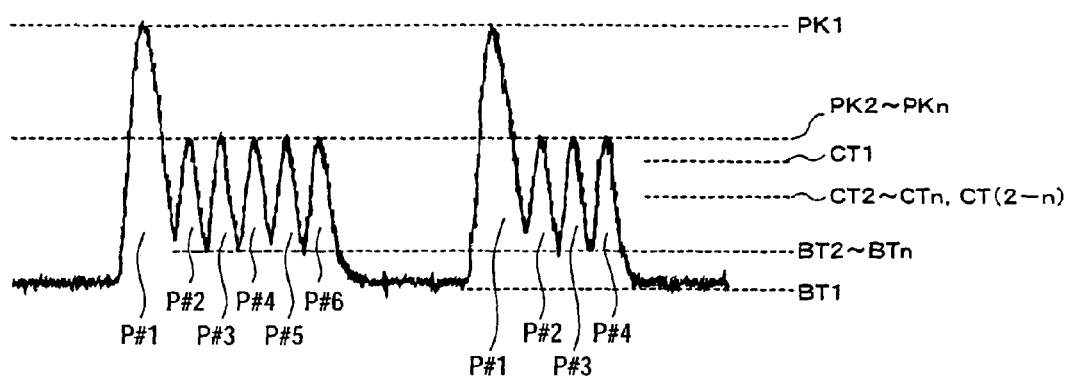
FIG. 2 is a view showing the RF signal.

For convenience of description, pulses observed in the RF signal are called first pulses P#1, second pulses P#2, third pulses P#3, . . . , and an n-th pulse P#n, as shown in FIG. 2.

In addition, the peak of the amplitude of a pulse is called "PK," the bottom value thereof is called "BT," and the center value thereof is called "CT." For example, the peak of the first pulse P#1 is expressed as "PK1," the peak of the second pulse P#2 is expressed as "PK2," and so on.

In the same way, the bottom value "BT" and the center value "CT" of the first pulse P#1 are called "BT1" and "CT1," the bottom value "BT" and the center value "CT" of the second pulse P#2 are called "BT2" and "CT2," and so on.

Further, the average of the second pulse P#2 to the nth pulse P#n is called "av." The average of the peak PK2 of the second pulse P#2 to the peak PKn of the n-th pulse P#n is called "avPK." The average of the bottom value BT2 of the second pulse P#2 to the bottom value BTn of the n-th pulse P#n is called "avBT." The average of the center value CT2 of the second pulse P#2 to the center value CTn of the n-th pulse P#n is called "avCT."

As shown in FIG. 1 and FIG. 2, the first pulse P#1 has a large amplitude, and the second pulse P#2 and subsequent pulses have relatively small amplitudes in the RF signal. This is because, since the generation of a mark is instantaneously started by laser emission caused by the first writing pulse in laser driving pulses, the second pulse P#2 and subsequent pulses in the RF signals have reduced amounts of reflected light due to the effect of the mark being formed. Namely, the RF signal, especially the second pulse P#2 and subsequent pulses, shows information affected by the mark being formed. In other words, the RF signal can be an information signal by which a mark generation state is monitored in real time.

FIG. 3 to FIG. 6 show RF-signal waveforms observed when various levels of recording laser power were used.

The figures show RF signals corresponding to the total quantity of light of a main beam having a DC component. Signals obtained from an RF-signal photodetector when an optical system emits pulse-train-manner lasers to a DVD-R are current-to-voltage converted, and amplified by an RF matrix amplifier to acquire the RF signals.

Figure 3:
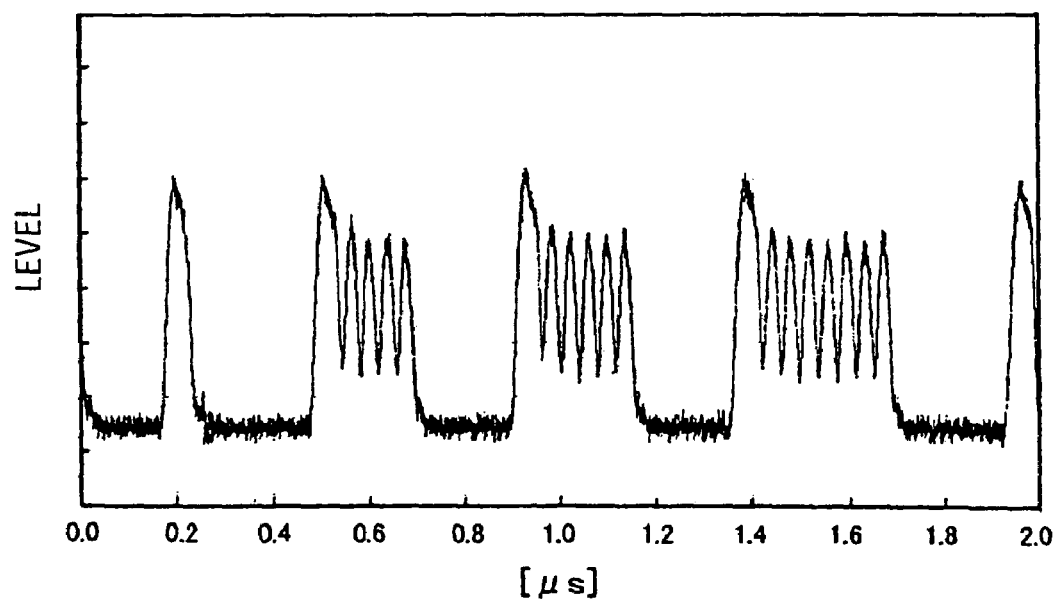
FIG. 3 is a view showing an RF-signal waveform obtained when a recording power is changed.
Figure 4:
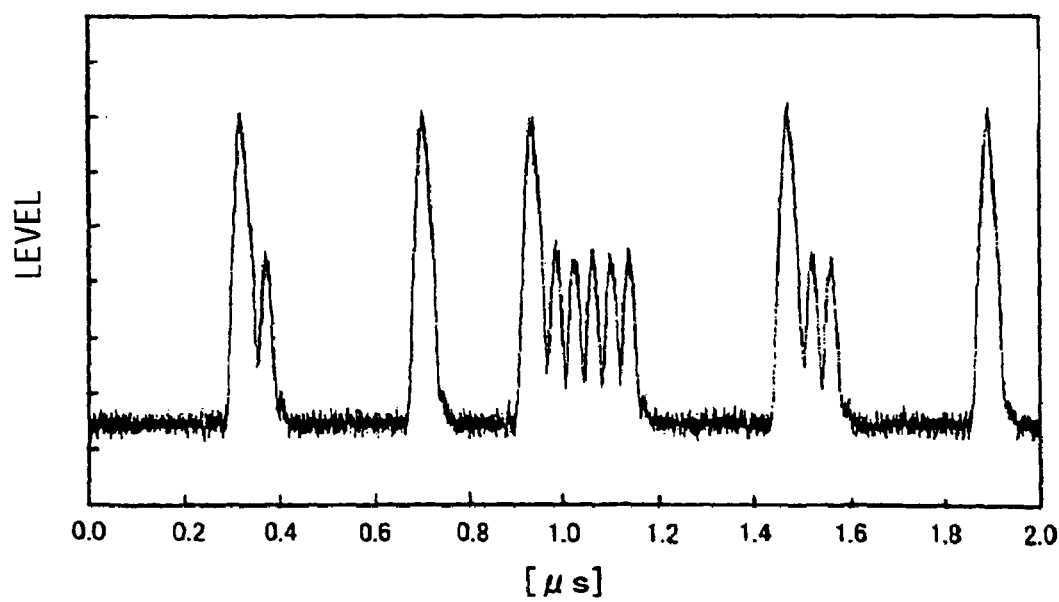
FIG. 4 is a view showing an RF-signal waveform obtained when the recording power is changed.
Figure 5:
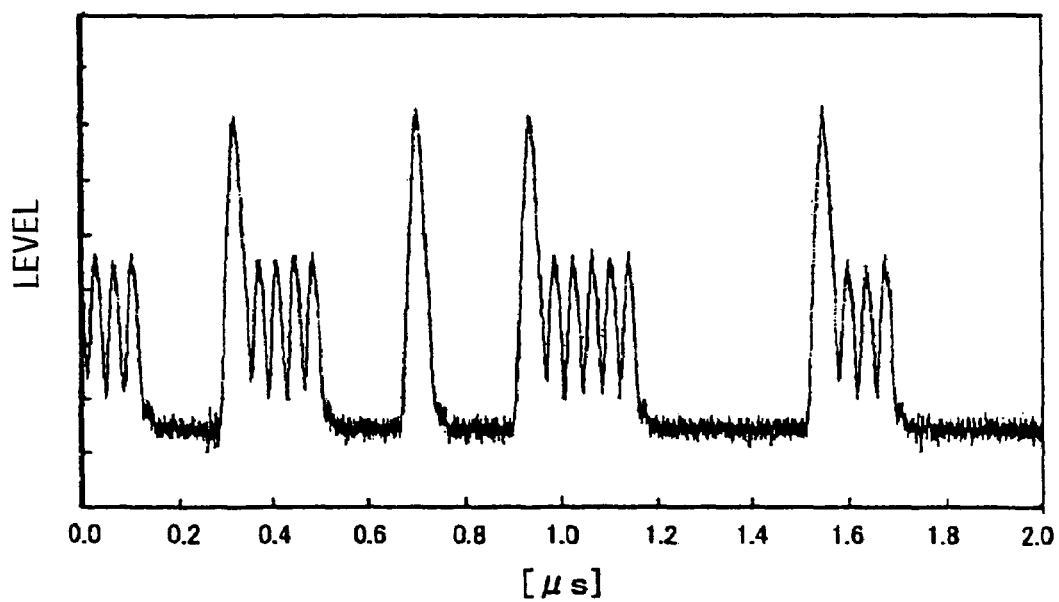
FIG. 5 is a view showing an RF-signal waveform obtained when the recording power is changed.
Figure 6:
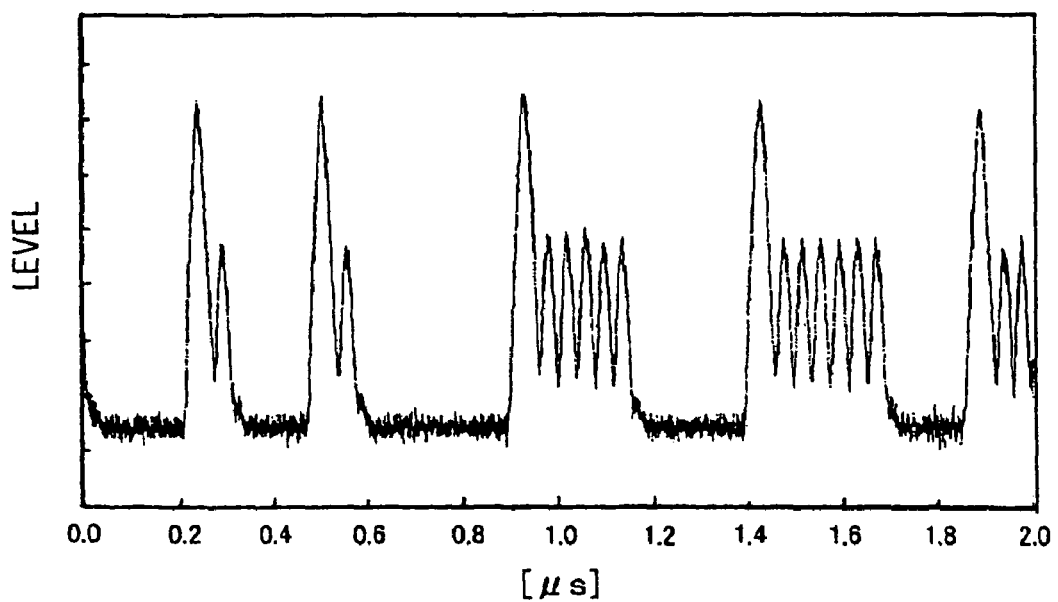
FIG. 6 is a view showing an RF-signal waveform obtained when the recording power is changed.

The average laser-output power was 2.24 mW in FIG. 3, 3.27 mW in FIG. 4, 3.73 mW in FIG. 5, and 4.72 mW in FIG. 6.

When the peak PK1 of the first pulse P#1 and the peaks PK2, . . . , and PKn of the second pulse P#2 and subsequent pulses in each RF signal are observed, it is found from the experimental results that the peaks PK2, . . . , and PKn of the second pulse P#2 and subsequent pulses were almost not changed under a certain recording condition (a determined recording medium, a determined optical system, and a determined linear velocity).

It is confirmed especially from the comparison between FIG. 3 and FIG. 4 that the ratios of the peak PK1 of the first pulse P#1 and the peaks PK2, . . . , and PKn of the second pulse P#2 and subsequent pulses were changed according to the magnitude of the quantity of light emitted on the recording medium.

In addition, it is also found that the quality of a reproduction RF signal became best in that recording area if the ratio of the peak PK1 and the peak PK2 was a certain constant value during recording, when the quality was evaluated by a jitter.

From these findings, it is understood that a feedback function can be implemented that allows recording power most suitable for generating marks to be output in an environment when an RF signal is monitored during recording; the ratio of, for example, the peak PK1 and the peak PK2 is calculated; and if the ratio is shifted from the value (reference value measured in advance in various conditions) regarded as that which provides the best recording condition, a compensation is given to a laser-power control system.

Figure 7:
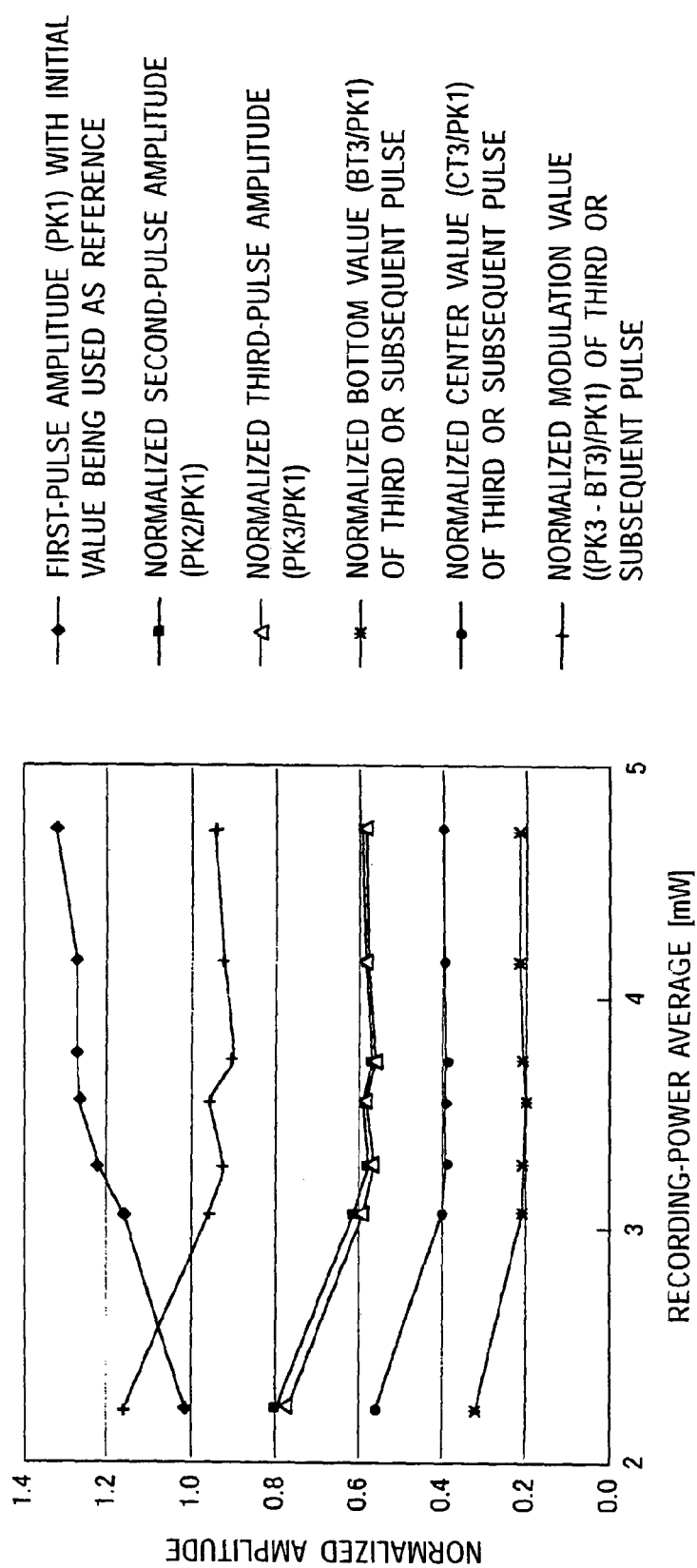
FIG. 7 is a view showing the relationship between the recording power and normalized amplitudes.

FIG. 7 shows the relationship between recording laser power and normalized amplitudes obtained from the experiments. Normalized amplitudes are the values obtained by dividing the amplitudes by the amplitude (peak) of the first pulse P#, that is, the ratio therebetween.

The figure show the peaks PK1 of the first pulses P#1, the normalized peaks (PK2/PK1) of the second pulses P#2, the normalized peaks (PK3/PK1) of the third pulses P#3, the normalized bottom values (such as BT3/PK1) of the third pulses P#3 (and subsequent pulses), the normalized center values (such as CT3/PK1) of the third pulses P#3 (and subsequent pulses), and the normalized modulation values (such as (PK3−BT3)/PK1) of the third pulses P#3 and subsequent pulses in a laser-power range of 2 mW to 5 mW.

It is assumed that the reproduction RF signal has the best quality in a predetermined linear-velocity condition of the system when the average recording power is about 2.8 mW.

For example, it can be considered that the normalized peak of the second pulse P#2 is reduced from 0.80 as the recording power is gradually increased, and the mark generation state becomes best when the normalized peak is settled at about 0.63.

From this phenomenon, it is understood that, if energy required for generating marks is insufficient due to an environmental temperature change or film unevenness on the medium, the normalized peak of the second pulse shows a value larger than 0.63, such as 0.70.

In other words, when the ratio (P2/P1), which is a normalized value, is monitored during recording; and an instruction for increasing the recording power to return the value to the normal value is given to the laser control system to actually increase the laser power, the normalized peak of the second pulse returns to 0.63, and the mark generation condition also becomes best in the environment.

Conversely, if the energy required for generating a mark is excessive, when the normalized amplitude of the second pulse is monitored and a difference with the target value of 0.63 is fed back to the laser control system, a mark is always generated in the best condition.

When a ratio to be detected is called B/A, the ratio (PK2/PK1) between the peak PK1 of the first pulse P#1 and the peak PK2 of the second pulse P#2 is used as the ratio B/A to be detected, in the foregoing description. It is understood from FIG. 7 that the normalized peaks, the normalized bottom values, the normalized center values, and the normalized modulation values of the third pulse P#3 and subsequent pulses are also changed linearly to some extent in a range of, for example, 2 mW to 3 mW (where it is assumed that there exists the most suitable laser power).

Therefore, it is considered that, in addition to the ratio between the peak PK1 of the first pulse P#1 and the peak PK2 of the second pulse P#2, the ratio between the peak PK1 and the peak PK3 (or PK4, . . . ), the ratio between the peak PK1 and the center value CT2 (or CT3, . . . ), the ratio between the peak PK1 and the bottom value BT2 (or BT3, . . . ), the ratio between the peak PK1 and the average av (or avPK, avCT, or avBT), the ratio between the peak PK1 and the modulation value (PK2−BT2, or PK3−BT3, . . . ), and so on can be used for laser-power feedback control in the same way.

When normalization is performed by using the center value CT1 of the first pulse P#1, it is considered that the same results are obtained. Therefore, the center value CT1 or the modulation value (PK1−BT1) may be used as the value A, instead of the peak PK1.

In other words, the ratio B/A to be detected can be PK3/PK1, BT2/PK1, CT2/PK1, avPk/PK1, or various others in addition to PK2/PK1.

Since there exists no second and subsequent pulses during a 3T-mark generation period as understood from FIG. 1, the value B is not obtained. Therefore, an operation for obtaining the ration B/A is not performed during the 3T-mark generation period.

A structure and operation according to the present embodiment will be described later. An operation point is that a ratio observed in the RF signal, that is, a ratio B/A, is detected, where a first signal value A indicates a signal value (such as PK1 or CT1) related to the first pulse, and a second signal value B indicates a signal value (such as PK2, PK3, CT2, CT3, BT2, BT3, av, or avPK) related to the second and subsequent pulses, and laser-power feedback control is performed according to the ratio, as described above.

In the present embodiment, as in an optical recording apparatus for organic-pigment-film recording media, it is assumed that a mark generation speed is faster than in usual phase-change media during a recording process, and luminous flux having recording power is obtained on an RF photodetector as reflected light from the surface of a medium, indicating the generation state of a mark to be changed by its energy, which passes through a returning path in the optical system.

It is further assumed that pulse-train-manner laser emission is employed in order to form marks at accurate positions by avoiding heat interference on a recording medium, in a high-density recording system.

In a so-called APC laser control method, which has been used conventionally, an APC photodetector monitors (front monitoring) part of outgoing luminous flux to obtain a change caused by an environmental temperature change or during aging in the I-L (current and optical output) characteristic of a semiconductor laser, the quantity of the outgoing light is estimated, and the estimated quantity is compared with the recording-power target value specified in advance to feedback the state to a laser driving circuit system.

To accurately obtain pulse-train-manner optical-recording waveforms, a circuit for sampling a monitoring signal of the quantity of outgoing light at timing corresponding to the pulse width is required. With this, even if an environmental temperature is changed, or aging occurs, the outgoing laser power is always maintained at a constant level.

This is just for controlling the laser output level so that it is the most suitable level. Factors which affect mark generation other than the I-L characteristic of the semiconductor laser, such as recording film unevenness or a change in the energy absorption efficiency of the recording medium caused by wavelength fluctuation due to a temperature change, described above, cannot be covered.

In the present embodiment, reflected light which includes mark-generation information is observed by the RF photodetector during recording; it is determined almost at the same time whether the recording power currently being output is most suitable for mark generation; and if the recording power is shifted from the most suitable state, a compensation is fed back to the laser-power control system to control the power of the semiconductor laser. Therefore, laser-power control which covers all factors which affect mark generation, such as recording film unevenness or a change in the energy absorption efficiency due to waveform fluctuation, can be implemented.

More specifically, a signal measured by the RF photodetector is observed at timing slightly delayed with respect to the pulse-train-manner outgoing luminous flux output from the semiconductor laser, due to a go-and-return optical length, photoelectric-conversion time, and transmission time, in a state limited by the frequency characteristics of the optical system and the electrical system. When the signal is sampled at suitable timing corresponding to pulse periods to obtain the ratios between measured amplitudes, it is determined whether a mark has been generated successfully. In other words, when the obtained ratios are compared with target ratio values, a feedback control signal is obtained for laser-power control.

2. Structure of Disk Drive Apparatus

A specific structure and operation according to the present embodiment will be described below.

A disk drive apparatus serving as an embodiment of an optical recording apparatus according to the present invention is, for example, an apparatus for recording and reproducing data into and from DVD-Rs. Compensation control with the ratio (B/A) of sample values of an RF signal, as described above, is performed in addition to APC control in laser-power control. It is assumed as the most fundamental processing that the ratio between the peak PK1 of the first pulse P#1 and the peak PK2 of the second pulse P#2 is used as the ratio (B/A), where PK1 serves as the value A and PK2 serves as the value B.

Various other ratios can be used, and they will be described laser in modifications.

Figure 8:
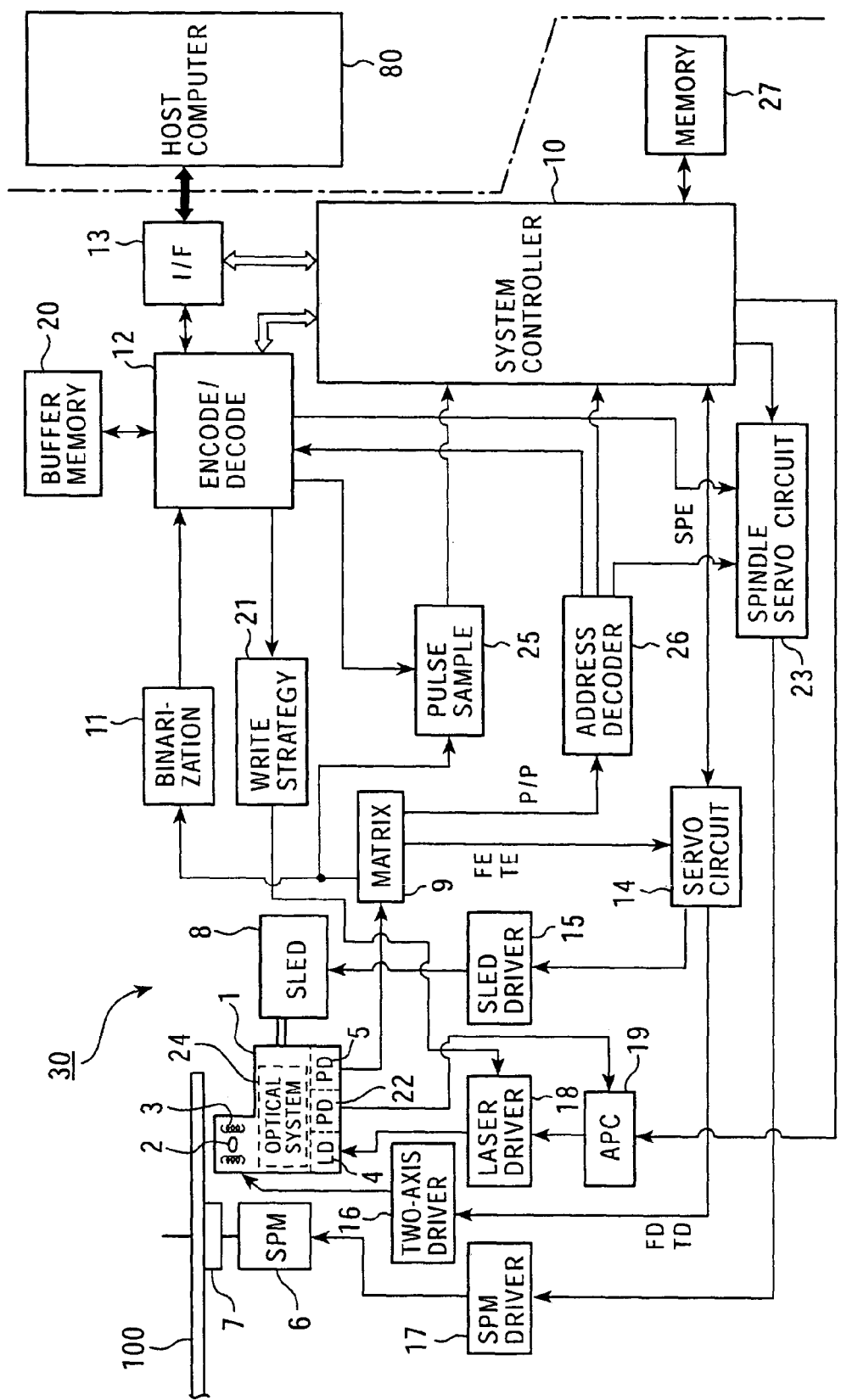
FIG. 8 is a block diagram of a disk drive apparatus according to the embodiment.
Figure 9:
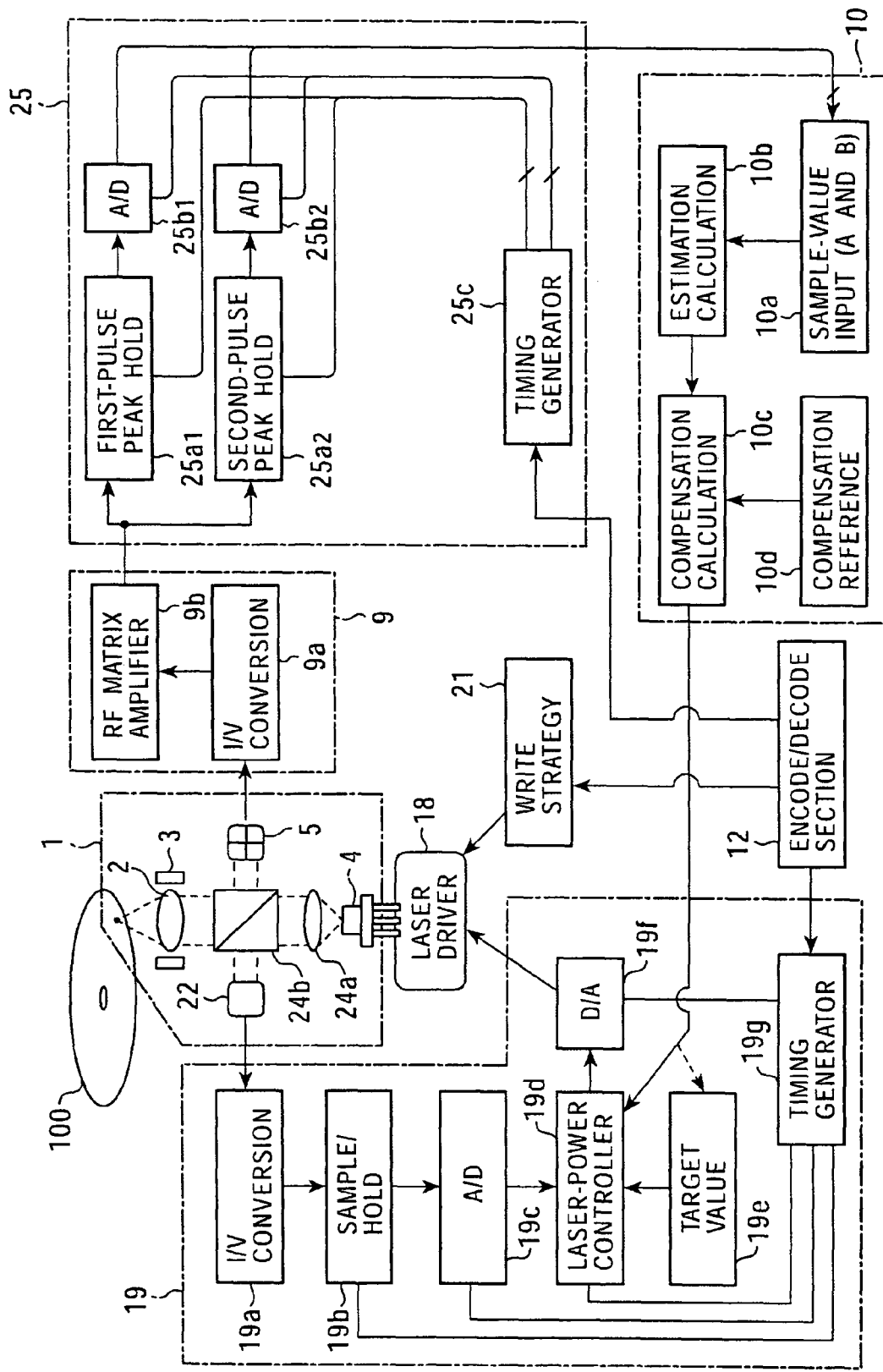
FIG. 9 is a block diagram of a main part of the disk drive apparatus according to the embodiment.

FIG. 8 shows the entire structure of a disk drive apparatus 30 according to the present embodiment. FIG. 9 illustrates the structure of a main part related to laser-power control in the structure shown in FIG. 8.

As shown in FIG. 8, a disk 100, such as a DVD-R, is mounted on a turntable 7, and rotated by a spindle motor 6 at a constant linear velocity (CLV) in a recording/reproduction operation.

An optical pickup 1 reads pit data recorded in tracks, track wobbling information, and land-prepit information. Pits recorded as data on tracks formed as grooves are so-called pigment-change pits.

In the pickup 1, a laser diode 4 serving as a laser light source, a photodetector 5 for detecting reflected light, an objective lens 2 serving as an output end of laser light, and an optical system 24 for illuminating a disk recording surface through the objective lens 2 and for leading reflected light therefrom to the photodetector 5 are provided.

A monitor detector 22 for receiving part of the output light from the laser diode 4 is also provided therein.

The structure inside the pickup 1 is shown in FIG. 9 in an outlined manner. Laser light output from the laser diode 4 is led to the objective lens 2 by the optical system 24, which has a grating plate (not shown), a collimator lens 24a, a retardation plate (not shown), a PBS (polarized beam splitter) 24b, and a multi-lens (not shown), and is emitted on the disk 100. Light reflected therefrom is detected by the photodetector 5.

Part of the laser light output from the laser diode 4 is also led to the monitor detector 22, and its detection light is used for an APC operation, described later.

The laser diode 4 outputs laser light having a wavelength of 650 nm or 635 nm. The optical system has an NA of 0.6.

The objective lens 2 is held by a two-axis mechanism 3 in a movable manner in a tracking direction and a focus direction.

The pickup 1 is held by a sled mechanism 8 in a movable manner in a disk radius direction as a whole.

The laser emission of the laser diode 4 of the pickup 1 is driven by a driving signal (driving current) sent from a laser driver 18.

As shown in FIG. 8, the information of light reflected from the disk 100 is detected by the photodetector 5, converted to an electric signal corresponding to the quantity of received light, and sent to a matrix circuit 9.

The matrix circuit 9 is provided with a current-to-voltage conversion circuit and a matrix calculation/amplification circuit for the output current of a plurality of light receiving elements serving as the photodetector 5, and generates necessary signals by matrix calculation processing.

For example, an RF signal corresponding to reproduced data, a focus-error signal FE for servo control, and a tracking-error signal TE are generated.

In addition, a push-pull signal P/P related to wobbling of land prepits and grooves is generated.

The RF signal output from the matrix circuit 9 is sent to a binarizing circuit 11, the focus-error signal FE and the tracking-error signal TE are sent to a servo circuit 14, and the push-pull signal P/P is sent to an address decoder 26.

The RF signal is also sent to a pulse sampling section 25, and is used for processing for laser-power compensation control, described later.

The address decoder 26 uses the push-pull signal P/P to extract land-prepit information, to generate a wobbling clock synchronized with track wobbling, and to decode address information pre-formatted on the disk 100. The decoded address information is sent to a system controller 10.

The generated wobbling clock is sent to the address decoder 26 and to a spindle servo circuit 23. An encoding clock is generated from the wobbling clock, and sent to a encoding/decoding section 12.

The RF signal obtained by the matrix circuit 9 is binarized in the binarization circuit 11, and sent to the encoding/decoding section 12.

The encoding/decoding section 12 is provided with a functional block serving as a decoder during reproduction and a functional block serving as an encoder during recording.

During reproduction, demodulation processing for the run-length-limited code, error correction processing, de-interleaving are performed as decoding processing to obtain reproduced data.

The encoding/decoding section 12 generates a reproduction clock synchronized with the RF signal by a PLL process, and executes the above-described decoding processing with the reproduction clock, during reproduction.

During reproduction, the encoding/decoding section 12 accumulates data decoded as described above in a buffer memory 20.

As a reproduction output of the disk drive apparatus 30, the data buffered in the buffer memory 20 is read and sent.

An interface section 13 is connected to an external host computer 80, and performs communications with the host computer 80 for recording data, reproduction data, and various types of commands.

During reproduction, the reproduction data decoded and stored in the buffer memory 20 is sent to the host computer 80 through the interface section 13.

A read command, a write command, and other signals are sent from the host computer 80 to the system controller 10 through the interface section 13.

During recording, the host computer 80 sends recording data. The recording data is sent from the interface section 13 to the buffer memory 20 and buffered therein.

In this case, the encoding/decoding section 12 executes encoding processing which includes error-correction-code addition, interleaving, sub-code addition, and run-length-limited code modulation for recording data for the disk 100, as encoding processing for the buffered recording data.

The encoding/decoding section 12 uses an encoding clock synchronized with the wobbling clock, as a reference clock for the encoding processing.

NRZI-format recording data generated in the encoding processing executed by the encoding/decoding section 12 is converted to pulse-train-manner recording pulses (laser driving pulses) by a write strategy 21, and sent to the laser driver 18.

The write strategy 21 also executes recording compensation, namely, fine adjustment of the most suitable recording power and adjustment of a laser-driving-pulse waveform according to the characteristics of a recording layer, the spot shape of the laser light, and a recording linear velocity.

The laser driver 18 gives driving current according to the received laser driving pulses to the laser diode 4 for laser emission driving. With this, pit marks (pigment change pits) are formed on the disk 90 according to recording data.

An APC circuit (auto power control) 19 is a circuit section for controlling the laser output such that it is constant irrespective of the temperature while monitoring the laser output power by the output of the monitor detector 22. The target value of the laser output is given by the system controller 10, and the APC circuit controls the laser driver 18 such that the laser output level has the target value.

A detailed example structure of the APC circuit will be described later by referring to FIG. 9.

The servo circuit 14 generates various servo driving signals, a focus driving signal, a tracking driving signal, and a sled driving signal, from the focus-error signal FE and the tracking error signal TE sent from the matrix circuit 9, and executes a servo operation.

More specifically, the servo circuit 14 generates the focus driving signal FD and the tracking driving signal TD according to the focus-error signal FE and the tracking-error signal TE, and sends them to a two-axis driver 16. The two-axis driver 16 drives a focus coil and a tracking coil in the two-axis mechanism 3 of the pickup 1. With this, a tracking servo loop and a focus servo loop are generated by the pickup 1, the matrix circuit 9, the servo circuit 14, the two-axis driver 16, and the two-axis mechanism 3.

The servo circuit 14 also turns off the tracking servo loop and outputs a jump driving signal to the two-axis driver 16 in response to a track jump instruction sent from the system controller 10 to execute a track jump operation.

The servo circuit 14 further generates the sled driving signal according to a sled-error signal obtained as a low-frequency component of the tracking-error signal TE and access execution control made by the system controller 10, and sends the signal to a sled driver 15. The sled driver 15 drives the sled mechanism 8 according to the sled driving signal. The sled mechanism 8 includes a mechanism, although not shown, formed of a main shaft for holding the pickup 1, a sled motor, and a transmission gear. When the sled driver 15 drives the sled mechanism 8 according to the sled driving signal, predetermined slide movement of the pickup 1 is performed.

The spindle servo circuit 23 performs control so as to CLV rotate the spindle motor 6.

The spindle servo circuit 23 obtains the wobbling clock as the information of the current rotation speed of the spindle motor 6 when data recording, and compares it with CLV reference speed information to generate a spindle-error signal SPE.

Since the reproduction clock (clock serving as decoding-processing reference) generated by the PLL in the encoding/decoding section 12 serves as the information of the current rotation speed of the spindle motor 6 when data reproduction, the clock is compared with the predetermined CLV reference speed information to generate a spindle-error signal SPE.

The spindle servo circuit 23 sends a spindle driving signal generated according to the spindle-error signal SPE to a spindle motor driver 17. The spindle motor driver 17 applies, for example, a three-phase driving signal to the spindle motor 6 according to the spindle driving signal to CLV rotate the spindle motor 6.

The spindle motor 23 also generates a spindle driving signal according to a spindle kick/brake control signal sent from the system controller 10, and makes the spindle 6 perform operations, for example, start rotating, stop rotating, accelerate rotating, or decelerate rotating by using the spindle motor driver 17.

The above-described various operations in the servo systems and the recording and reproduction system are controlled by the system controller 10 formed of a microcomputer.

The system controller 10 executes various types of processing according to commands sent from the host computer 80.

When the host computer 80 sends a read command which requests the transmission of data recorded in the disk 100, for example, seek-operation control is first performed with a specified address being set to the target. More specifically, an instruction is sent to the servo circuit 14 to make the pickup 1 perform an access operation with the address specified by a seek command being set to the target.

Then, operation control required for sending data in a specified data area to the host computer 80 is performed. In other words, the required data is read from the disk 100, decoded, buffered, and sent.

When the host computer 80 sends a write command, the system controller 10 first moves the pickup 1 to an address where data is to be written. Then, the system controller 10 makes the encoding/decoding section 12 apply the encoding processing to the data sent from the host computer 80, as described above.

Laser driving pulses are sent from the write strategy 21 to the laser driver 18, as described above, to perform recording.

A memory 27 collectively indicates a ROM, a RAM, and a non-volatile memory used by the system controller 10 for processing. The memory 27 may be a memory built in the system controller 10, formed of the microcomputer.

The memory 27 is used as a working area for calculations and storage of a program, various coefficients, and constants required for a control operation in the disk drive apparatus. In the present embodiment, various system conditions (such as a medium type and a linear velocity) and the ratios (PK2/PK1) most suited thereto are stored in a non-volatile area of the memory 27 as information for a laser-power compensation operation, described later. For example, the most suitable ratios are experimentally obtained under various system conditions before the apparatus is shipped from the factory, and the experimental results are stored as a data table.

In summary, the reproduction operation and the recording operation of the disk drive apparatus 30 can be described as follows:

<Reproduction Operation>

Servo Operation

A signal detected by the pickup 1 is converted to servo-error signals, such as the focus-error signal FE and the tracking-error signal TE, in the matrix circuit 9, and sent to the servo circuit 14. The driving signals FD and TD output from the servo circuit 14 drive the two-axis mechanism 3 of the pickup 1 to perform focus servo and tracking servo.

Data Reproduction

A signal detected by the pickup 1 is converted to an RF signal in the matrix circuit 9, and sent to the encoding/decoding section 12. The encoding/decoding section 12 reproduces a channel clock and performs decoding according to the channel clock. Decoded data is sent to the interface section 13.

Rotation Control

The channel clock reproduced by the encoding/decoding section 12 is sent to the spindle servo circuit 23, and the rotation of the disk 100 is controlled thereby.

Address Reproduction

An address is included in the RF signal, decoded by the encoding/decoding section 12, and sent to the system controller 10.

Laser Control

The APC circuit 19 performs control so as to maintain a constant laser output, according to an instruction of the system controller 10.

<Recording Operation>

Servo Operation

The same operation as in reproduction is performed. The matrix circuit 9 or the servo circuit 14 performs compensation such that an increase in gain caused by an increase in laser power does not occur.

Data Recording

Channel coding, such as ECC addition, re-arrangement, and modulation, is applied by the encoding/decoding section 12 to data received through the interface section 13. The data, to which the channel coding has been applied, is converted to laser driving pulses suited to the disk 100 in the write strategy 21, and applied to the laser diode 4 of the pickup 1 through the laser driver 18 (APC circuit 19).

Rotation Control

The wobbling clock is generated from the push-pull signal P/P output from the matrix circuit 9, sent to the spindle servo circuit 23, and used for constant-linear-velocity (CLV) rotation control.

Address Reproduction

The land-prepit information is detected from the push-pull signal P/P output from the matrix circuit 9. The detected land-prepit information is decoded to generate an address, and read by the system controller 10.

The encoding clock is also generated from the push-pull signal P/P, and sent to the encoding/decoding section 12.

A structure used for laser-power control in the present embodiment will be described below by referring to FIG. 9. Since laser-power compensation performed during recording is a point in operations in the present embodiment, the following description will be made for recording operations.

As it is understood from the above description made by referring to FIG. 8, when laser driving pulses, that is, a combination pattern of a specified laser-driving-current value and a modulated signal, are input to the laser driver 18 from the write strategy 21 during recording, the laser diode 4 emits laser light, and the objective lens 2 condenses the laser light as an optical spot and projects at a predetermined area on the disk 100 through the above-described optical system 24.

The detector 22 for front monitoring receives part of outgoing luminous flux, and detects the quantity of light to estimate the quantity of the emitted light of laser power.

The luminous flux condensed on the disk 100 is returned to the optical system 24 as reflected light (reproduction signal) while reflecting a mark generation state on the disk, and finally projected on the RF-signal photodetector 5 divided into multiple pieces.

The APC circuit 19 includes, for example, a current/voltage conversion section 19a, a sample/hold circuit 19b, an A/D converter 19c, a laser-power controller 19d, a target-value holding section 19e, a D/A converter 19f, and a timing generator 19g, as shown in FIG. 9.

The timing generator 19g outputs various timing signals according to encoded data, namely, a signal serving as the source of laser driving pulses, output from the encoding/decoding section 12 to control the operation timing of the sample/hold circuit 19b, the A/D converter 19c, and the laser-power controller 19d.

Pulse-train-manner laser emission is performed during recording. The APC circuit 19 monitors recording-level laser power to maintain it at the target value.

A signal (current corresponding to the quantity of received light) sent from the monitor detector 22 is converted to a voltage at the current/voltage conversion section 19a, and sent to the sample/hold circuit 19b. Since pulse-train-manner laser emission is performed, the sample/hold circuit 19b samples and holds the signal at for period where a pulse-train pulse width is maintained, namely, a period where a recording-power laser output is applied, at appropriate timing according to a timing signal sent from the timing generator 19g.

The voltage held and output is converted to a digital value by the A/D converter 19c, and sent to the laser-power controller 19d as the current estimated laser power.

The laser-power controller 19d compares a laser-power target value specified in the target-value holding section 19e with the estimated laser power to superpose the quantity corresponding to the difference therebetween onto the current indication, and sends it to the laser driver 18 through the D/A converter 19f. The system controller 10 sets a target laser-power value in the target-value holding section 19e.

With such an operation in the APC circuit 19, a function for maintaining the laser output power at the target value is obtained.

As described before, the operation performed by the APC circuit 19 is to control the laser output at a constant level, and does not optimize the recording power with factors, such as laser-wavelength fluctuation and recording-film unevenness, being taken into account.

In the present embodiment, a structure for laser-power compensation is further provided. More specifically, an RF signal is sampled to obtain a ratio, and laser-power compensation is performed according to the ratio.

As shown in FIG. 9, the matrix circuit 9 is provided with a current/voltage conversion section 9a and an RF matrix amplifier 9b as a structure for obtaining an RF signal. With these components, an RF signal is generated according to the quantity of reflected light detected by the photodetector 5.

The RF signal obtained in the matrix circuit 9 is sent to the pulse sampling section 25. The pulse sampling section performs sampling required for calculating the ratio.

In the present embodiment, it is assumed that the ratio B/A obtained for the RF signal is set to the ratio PK2/PK1 between the peak PK1 of the first pulse P#1 and the peak PK2 of the second pulse P#2.

Therefore, the pulse sampling section 25 is configured such that the peaks PK1 and PK2 are sampled as the values A and B.

More specifically, a peak holding circuit 25a1 and an A/D converter 25b1 corresponding to the peak PK1, and a peak holding circuit 25a2 and an A/D converter 25b2 corresponding to the peak PK2 are provided. In addition, a timing generator 25c is also provided.

Figure 10:
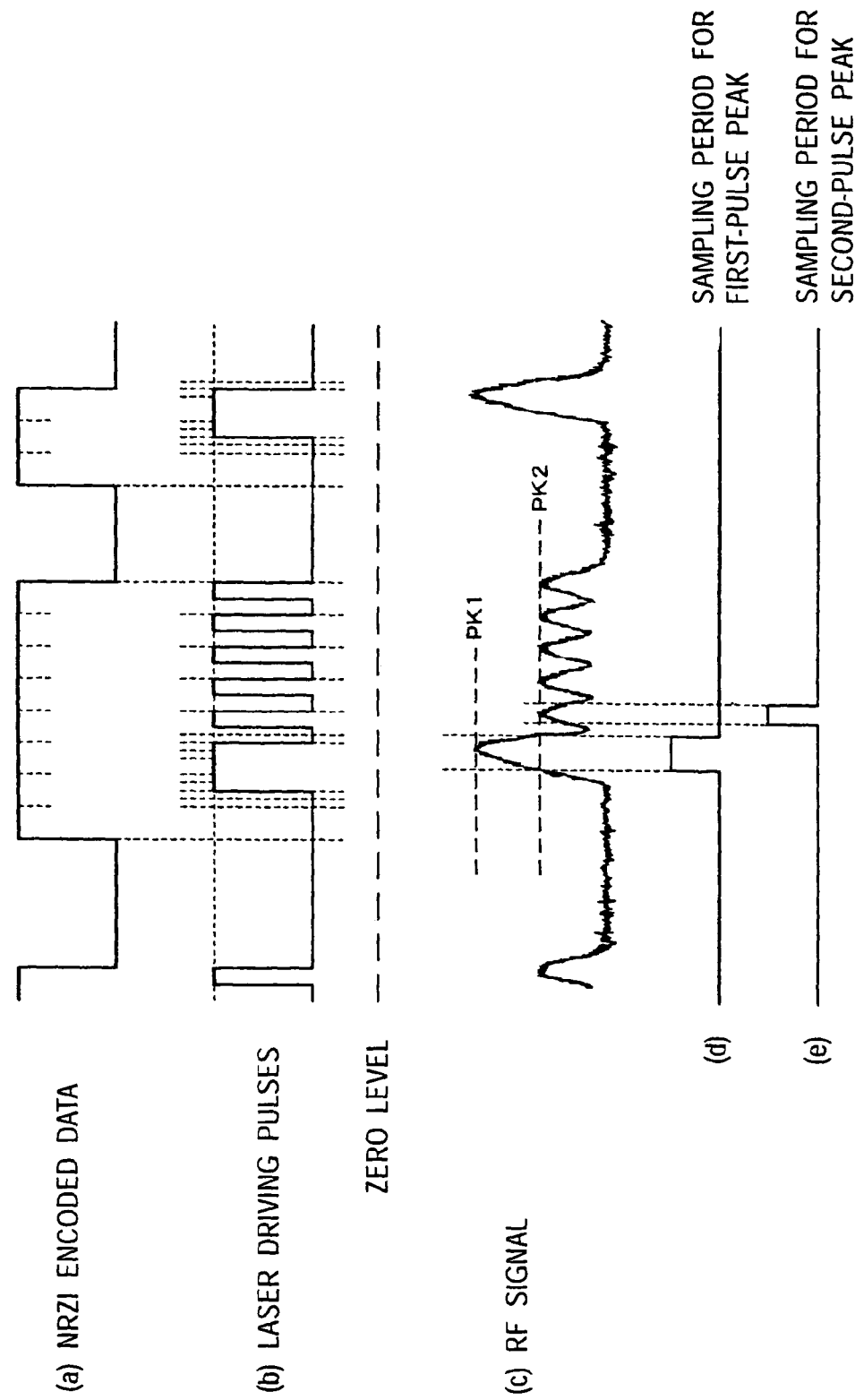
FIG. 10 is a view showing RF-signal sampling operations according to the embodiment.

The timing generator 25c sends a signal shown in FIG. 10(d), which indicates a sampling period corresponding to a period of the first pulse P#1 in an RF signal shown in FIG. 10(c), to the peak holding circuit 25a1 according to the encoded data shown in FIG. 10(a) sent from the encoding/decoding section 12 to hold and output the peak during the period. The timing generator 25c also applies timing control to the A/D converter 25b1 so as to convert the held and output peak to a digital value.

The timing generator 25c further sends a signal shown in FIG. 10(e), which indicates a sampling period corresponding to a period of the second pulse P#2 in the RF signal, to the peak holding circuit 25a2 to hold and output the peak during the period. The timing generator 25c also applies timing control to the A/D converter 25b2 so as to convert the held and output peak to a digital value.

With these operations, the A/D converter 25b1 outputs the peak PK1 as the digital value to the system controller 10, and the A/D converter 25b2 outputs the peak 2 as the digital value to the system controller 10.

Since the pulse-train-manner laser driving pulses shown in FIG. 10(b) are generated according to the encoded data shown in FIG. 10(a), the timing generator 25c can obtain the timing of the first-pulse P#1 period and the second-pulse P#2 period in the RF signal shown in FIG. 10(c) from the encoded data. Actually, there is a delay caused by processing in the optical system 24 and the matrix circuit 9 between laser-output timing and timing when the pulse sampling section 25 receives the RF signal, which is reflected-light information. Therefore, the timing generator 25c generates timing signals for sampling periods with the delay being taken into account.

The system controller 10 reads the peaks PK1 and PK2 as the values A and B for which the ratio is to be calculated, calculates the ratio, and compares the calculated ratio with a reference ratio to generate a laser-power compensation signal.

In FIG. 9, functional blocks for generating such a laser-power compensation signal are shown inside the system controller 10.

A sampled-value input section 10a, an estimation calculation section 10b, a compensation calculation section 10c, and a compensation-reference holding section 10d are provided. Actually, these sections need to be implemented by software in the system controller 10.

Detailed processing examples will be described by referring to FIG. 11 and FIG. 12. The sampled-value input section 10a reads the peak PK1 as the value A and the peak PK2 as the value B, and sends them to the estimation calculation section 10b. The estimation calculation section 10b calculates a ratio B/A (PK2/PK1) as an estimate of the current laser power.

The compensation-reference holding section 10d holds the most appropriate PK2/PK1 value (hereinafter called a reference ratio) corresponding to the current recording conditions, including the current linear velocity. For example, among the most appropriate ratios for recording conditions, stored in the memory 27 shown in FIG. 8 as the table, as described above, the most appropriate ratio corresponding to the current conditions has been loaded.

The compensation calculation section 10c compares the ratio calculated by the estimation calculation section 10b with the reference ratio held by the compensation-reference holding section 10d to generate the laser-power compensation signal.

The laser-power compensation signal is sent to the laser-power controller 19d in the APC circuit 19. The laser-power controller 19d compensates, for example, the target value stored in the target-value holding section 19e and used for the laser-power regulation control, described above, according to the laser-power compensation signal.

The target value itself stored in the target-value holding section 19e may be updated by the laser-power compensation signal.

With such a structure, in the present embodiment, the ratio serving as a recording-power estimate is calculated almost at the same time when recording, from the correlation of the amplitudes of the RF signal corresponding to the pulse-train-manner waveform. The ratio is compared with the reference ratio to calculate a value used for compensating the recording power. The operation in the APC loop is compensated. With this, feedback for most-appropriate recording-power control is implemented with a mark generation state on the disk 100 being taken into account.

3. Recording-Power Compensation Operation

EXAMPLE 1

A specific example of the laser-power compensation processing performed in the system controller 10, that is, the processing executed by the functional blocks shown in FIG. 9 inside the system controller 10, will be described by referring to FIG. 11.

Steps shown in FIG. 11 correspond to the functional blocks shown in FIG. 9 as follows:

F101 and F102: Compensation-reference holding section 10d

F103 and F104: Sampled-value input section 10a

F105: Estimation calculation section 10b

F106 to F109: Compensation calculation section 10c

In the recording-laser-power compensation processing, the system controller 10 first checks various system conditions related to a recording operation in step F101. More specifically, the system controller 10 checks a medium type, a recording linear velocity, and a recording-power target value.

Then, in step F102, a reference ratio (B/A)ref suited to the system conditions is read from the data table stored in the memory 27.

With this, a preparation for the compensation processing has been finished, and a compensation calculation process starts at step F103.

In step F103, the peak PK1 of the first pulse P#1 output from the A/D converter 25b1 is read as the value A.

In step F104, the peak PK2 of the second pulse P#2 output from the A/D converter 25b2 is read as the value B.

Then, in step F105, the ratio B/A is calculated.

In step F106, the calculated ratio B/A is compared with the reference ratio (B/A)ref.

When the ratio B/A is larger than the reference value (B/A)ref, the processing proceeds to step F109, and the value obtained by increasing the current recording-power target value, that is, the recording-power target value held by the target-value holding section 19e of the APC circuit 19, by 0.5 mW is set to a new compensated recording-power target value.

Then, in step F108, the new recording-power target value is sent to the laser-power controller 19d as a laser-power compensation signal, and the APC loop is made to execute laser power control by using the new recording-power target value. The processing returns to step F103.

When the ratio B/A is smaller than the reference value (B/A)ref in step F106, the processing proceeds to step F107, and the value obtained by reducing the current recording-power target value, that is, the recording-power target value held by the target-value holding section 19e of the APC circuit 19, by 0.5 mW is set to a new compensated recording-power target value.

Then, in step F108, the new recording-power target value is sent to the laser-power controller 19d as a laser-power compensation signal, and the APC loop is made to execute laser power control by using the new recording-power target value. The processing returns to step F103.

After the processing returns to step F103, the same processes are repeated.

In summary, the ratio B/A is compared with the reference ratio (B/A)ref, and the recording-power target value in the APC loop is increased or reduced by 0.5 mW at a time such that the ratio B/A converges almost at the reference ratio (B/A)ref.

When the ratio B/A becomes almost equal to the reference ratio (B/A)ref at a point of time in step F106, the recording-power-target-value compensation processing is terminated.

Figure 11:
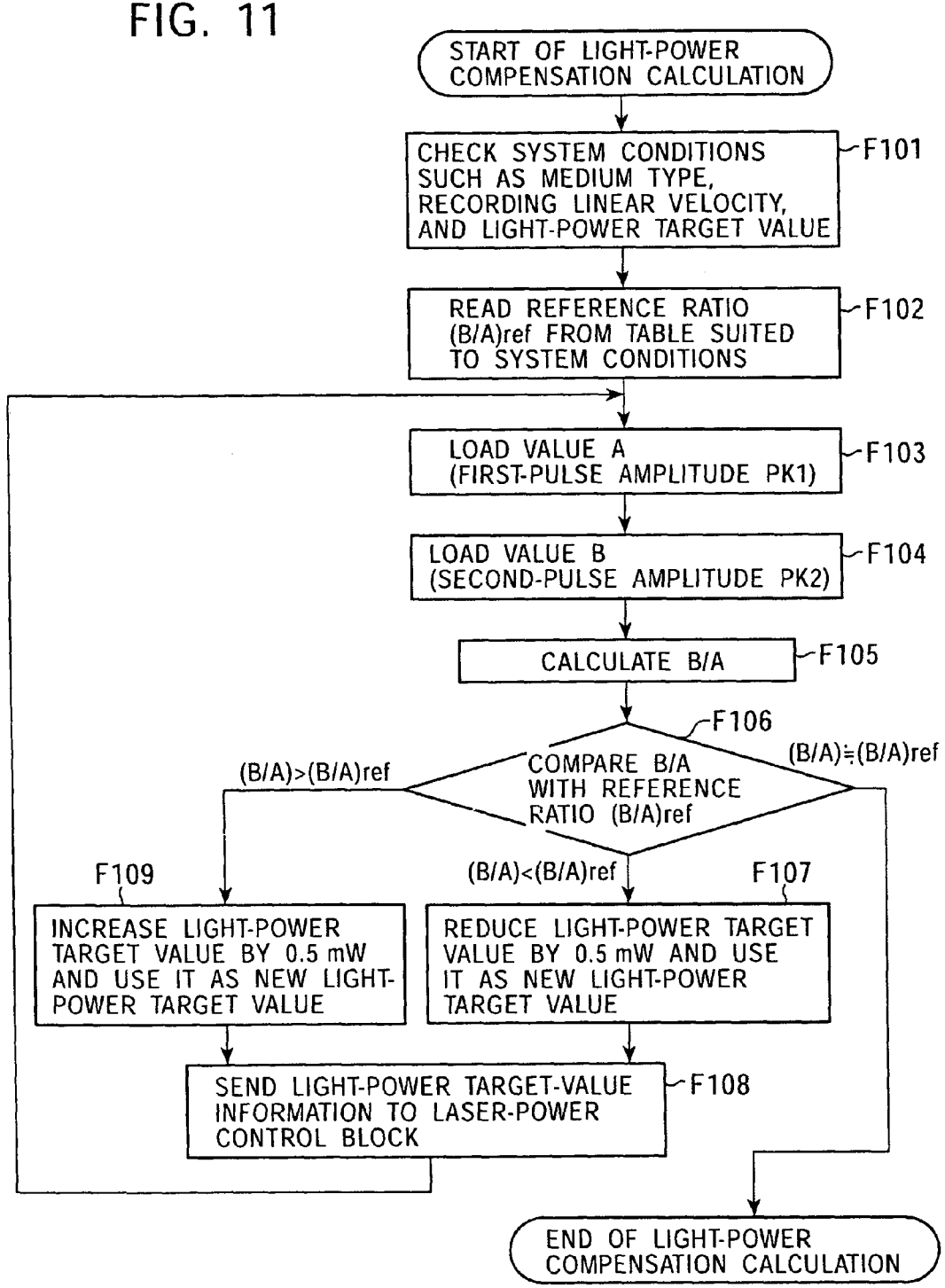
FIG. 11 is a flowchart of recording-power compensation processing according to the embodiment.

As described above, according to the processing example shown in FIG. 11, the recording-power target value used as the reference in the APC circuit 19 is compensated according to the comparison between the ratio B/A and the reference value (B/A) ref such that the ratio B/A finally matches the reference ratio (B/A)ref, that is, the recording laser power reaches the most appropriate recording laser power.

With such laser-power compensation processing being performed, the actual recording power is controlled so as to be most appropriate for the current recording-operation environment. With this, the laser output can be controlled for laser wavelength fluctuation due to the temperature dependency of the I-L characteristic of the laser diode 4 or aging, a change in the energy absorption efficiency of the disk 100 due thereto, and a change in the most appropriate recording power due to the film unevenness of the disk 100. Therefore, the most appropriate mark-generation operation is implemented, and the quality (jitter and others) of an RF signal is improved when reproduction.

4. Recording-Power Compensation Operation

EXAMPLE 2

Figure 12:
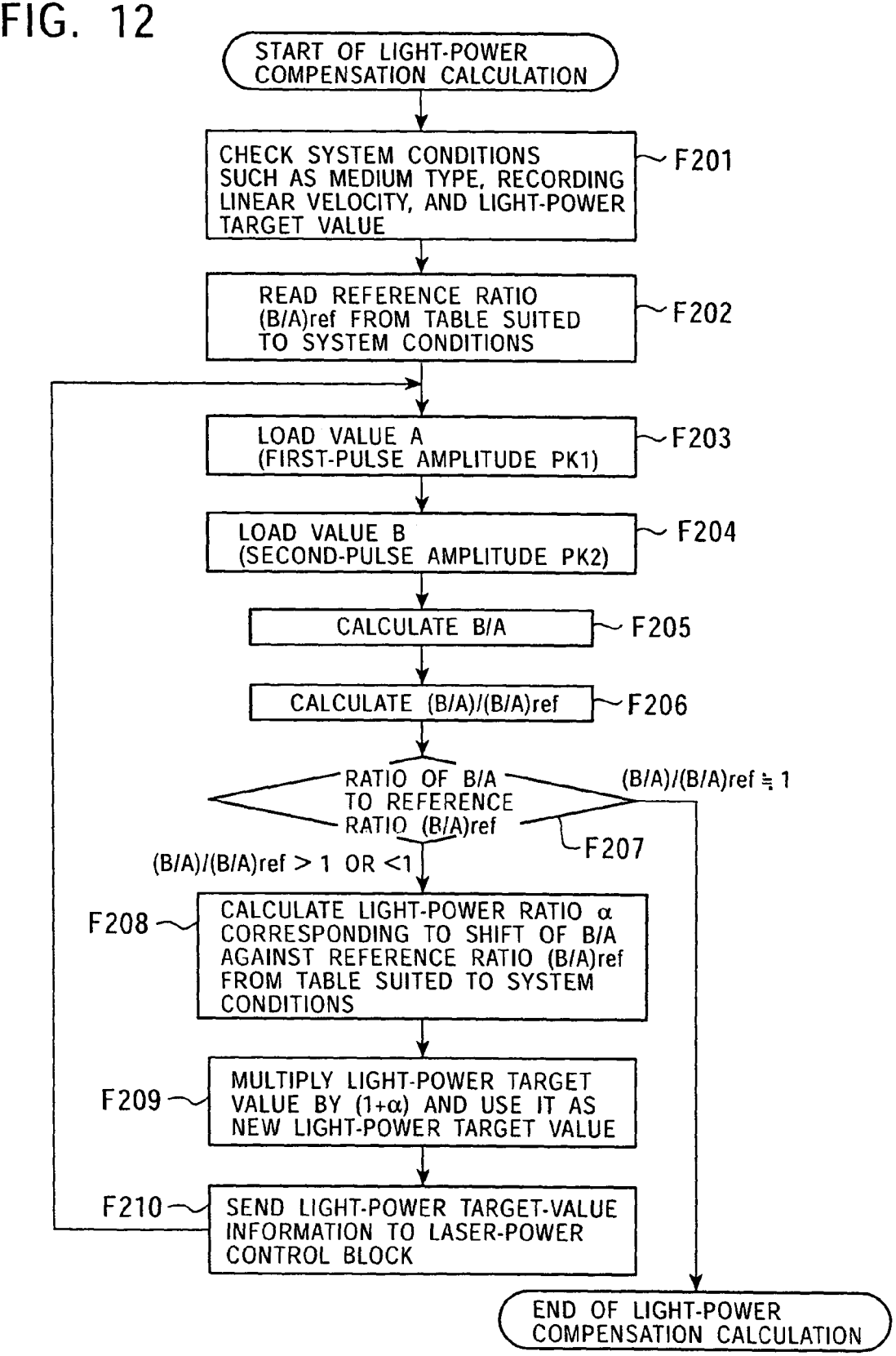
FIG. 12 is a flowchart of another recording-power compensation processing according to the embodiment.

FIG. 12 shows a processing example which can be employed in stead of that shown in FIG. 11, as recording-power compensation processing.

Since steps F201 to F205 are the same as steps F101 to F105 shown in FIG. 11, a description thereof is omitted.

In the processing example shown in FIG. 12, after the ratio B/A is calculated in step F205, (B/A)/(B/A)ref is calculated in step F206.

Then, in step F207, it is determined whether (B/A)/(B/A)ref is "1" or not. When it is not "1" (does not fall in a area where it is regarded as "1"), the processing proceeds to step F208.

In F208, a ratio α corresponding to the shift of the ratio B/A against the reference ratio (B/A)ref is calculated.

Figure 13:
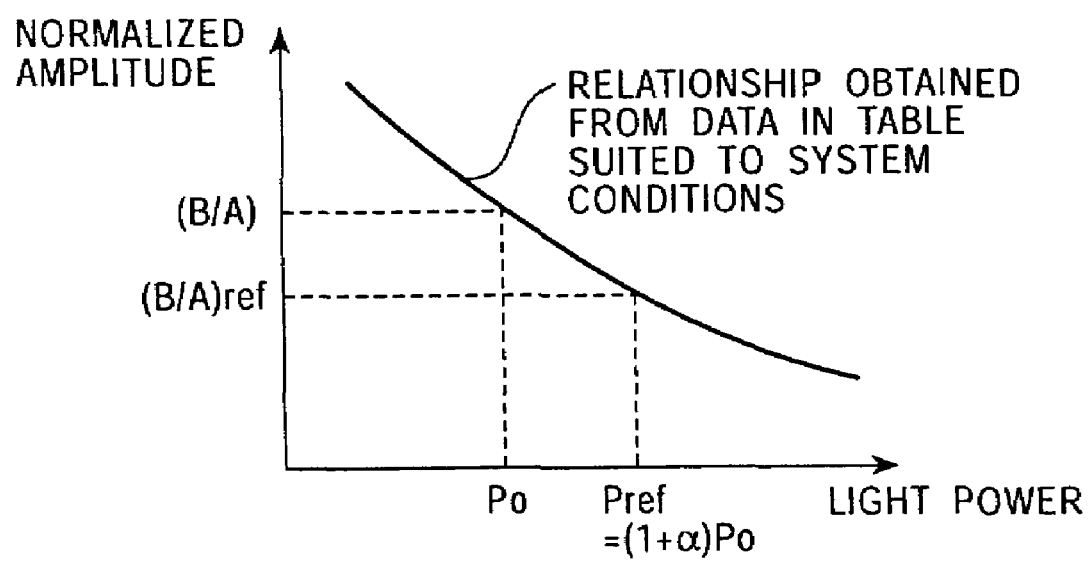
FIG. 13 is a view showing the relationship between a ratio and recording power in a recording-power compensation processing according to the embodiment.

FIG. 13 shows the relationship between the recording power, and the ratio B/A and the reference ratio (B/A)ref obtained from the table data. Under the current system conditions, it is assumed that recording power Pref shown in the figure is the most appropriate. In this case, according to the calculated ratio B/A, the current power is estimated as recording power Po shown in the figure with the system conditions being taken into consideration.

In the above description, the ratio α is specified in Pref=(1+α)Po, and indicates the increase ratio of the current recording-power target value to the new compensated recording-power target value.

The ratio α satisfies, for example, −0.3≦α≦0.3.

After the ratio α is calculated, the value obtained by multiplying the current recording-power target value, that is, the recording-power target value held by the target-value holding section 19*e* of the APC circuit 19, by (1+α) is set to a new compensated recording-power target value.

Then, in step F210, the new recording-power target value is sent to the laser-power controller 19*d* as a laser-power compensation signal, and the APC loop is made to execute laser power control by using the new recording-power target value. The processing returns to step F203.

In such compensation processing, if algorithm used for calculating the ratio α for compensation is ideal and the recording-power target value reaches the most appropriate value by one compensation operation, the processing may be finished at step F210. When a condition that the algorithm is not always ideal is taken into account, however, it is preferred that the processing return to step F203, the determination at step S207 be repeated, and the compensation processing be finished after the laser power sufficiently approaches the most appropriate state, that is, (B/A)/(B/A)ref reaches "1" (or falls in an area in which it is regarded as "1").

Even with such laser-power compensation processing, the laser output can be controlled for a change in the energy absorption efficiency of the disk 100 due laser wavelength fluctuation and a change in the most appropriate recording power due to the film unevenness of the disk 100. Therefore, the most appropriate mark-generation operation is implemented, and the quality (jitter and others) of an RF signal is improved when reproduction.

5. Various Modifications

The disk drive apparatus 30 and the laser-power compensation operation thereof have been described in the embodiment. The present invention is not limited to the above embodiment, and various modifications can be considered.

In the above-described embodiment, the peak PK1 of the first pulse P#1 and the peak PK2 of the second pulse P#2 are sampled, and PK2/PK1 is used as the ratio B/A.

However, the ratio B/A is not limited to this ratio, and can be other various ratios as described above.

Figure 14:
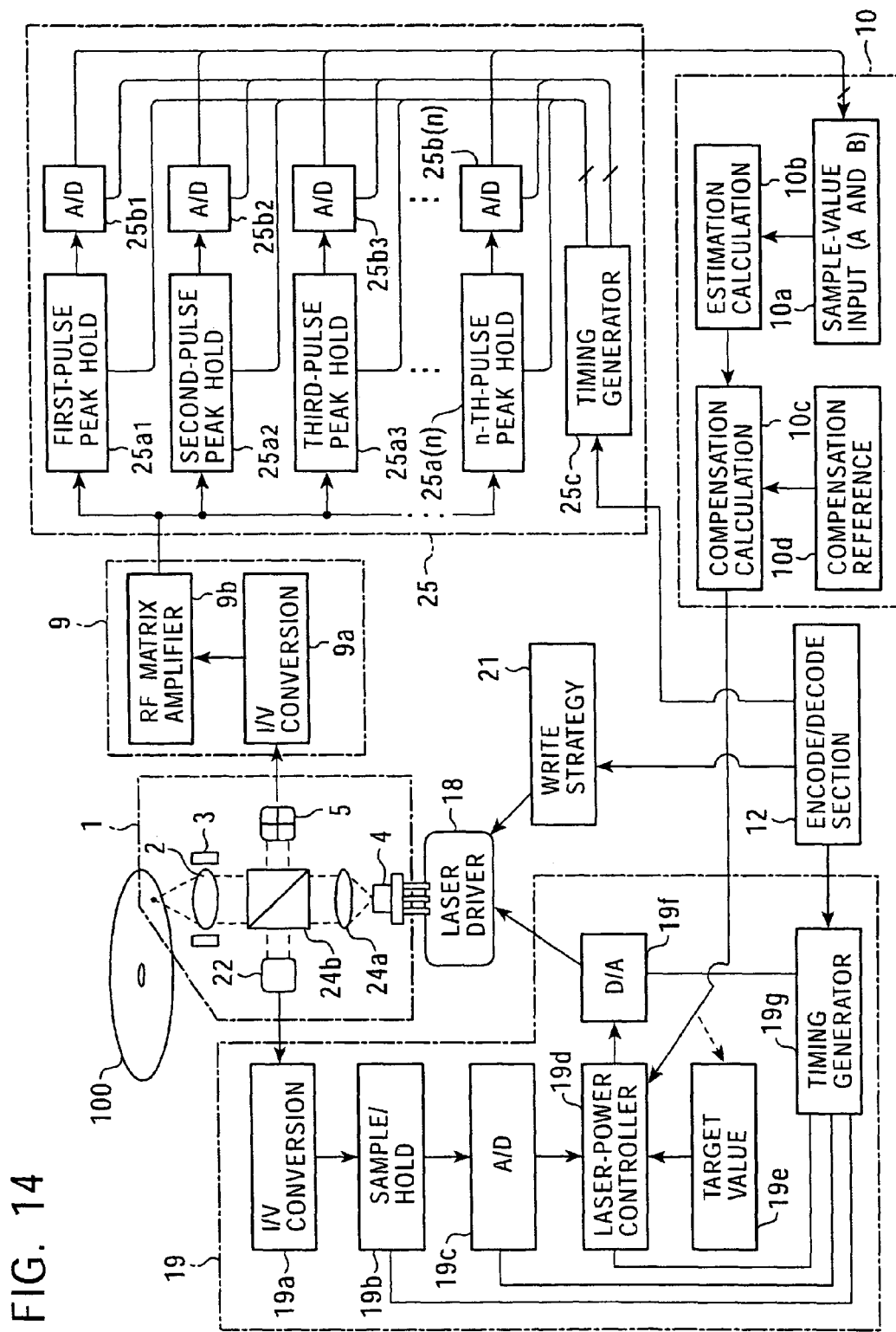
FIG. 14 is a block diagram of another example structure of the main part of the disk drive apparatus according to the embodiment.

For example, when the average avPK of the peaks of the second pulse P#2 and subsequent pulses is used as the value B, the pulse sampling section 25 needs to be configured as shown in FIG. 14.

More specifically, in this case, the pulse sampling section 25 is provided with a peak holding circuit 25*a*1 and a A/D converter 25*b*1 corresponding to the peak PK1 as a structure for obtaining the value A. Since the average avPK is used as the value B, a peak holding circuit 25*a*2 and a A/D converter 25*b*2 corresponding to the peak PK2, a peak holding circuit 25*a*3 and a A/D converter 25*b*3 corresponding to the peak PK3, . . . , and a peak holding circuit 25*a*(*n*) and a A/D converter 25*b*(*n*) corresponding to the peak PKn are provided as structures for sampling the peaks PK2, PK3, and PKn of the second pulse P#2 and subsequent pulses.

The timing generator 25*c* sends a signal shown in FIG. 15(*d*), indicating a sampling period corresponding to a period of the first pulse P#1 in an RF signal shown in FIG. 15(*c*) according to encoded data shown in FIG. 15(*a*) sent from an encoding/decoding section 12 to the peak holding circuit 25*a*1 to hold and output the peak in the period. In addition, the timing generator 25*c* performs timing control such that the A/D converter 25*b*1 converts the held and output peak to a digital value.

The timing generator 25*c* also sends a signal shown in FIG. 15(*e*), indicating a sampling period corresponding to a period of the second pulse P#2 in the RF signal to the peak holding circuit 25*a*2 to hold and output the peak in the period. In addition, the timing generator 25*c* performs timing control such that the A/D converter 25*b*2 converts the held and output peak to a digital value.

The timing generator 25*c* further sends a signal shown in FIG. 15(*f*), indicating a sampling period corresponding to a period of the third pulse P#3 in the RF signal to the peak holding circuit 25*a*3 to hold and output the peak in the period. In addition, the timing generator 25*c* performs timing control such that the A/D converter 25*b*3 converts the held and output peak to a digital value.

Although not shown in the figure, the timing generator 25*c* generates signals indicating sampling periods for the fourth pulse P#4 to the n-th pulse P#n and signals for controlling A/D conversion timing.

With this, the A/D converter 25*b*1 outputs the peak PK1 as a digital value, and a sampled-value input section 10*a* in a system controller 10 reads the peak PK1 as the value A.

The A/D converters 25*b*2 to 25*b*(*n*) also input the peaks PK2, . . . , and PKn of the subsequent pulses to the sampled-value input section 10*a*. The sampled-value input section 10*a* obtains the average avPK thereof by the calculation of (PK2+PK3+ . . . +PKn)/n, and sets the calculated average avPK in the value B.

Then, an estimation calculation section 10*b* needs to obtain the ratio B/A from the values A and B, and a compensation calculation section 10c needs to generate a laser-power compensation signal in the same way as described above. In other words, the processing shown in FIG. 11 or FIG. 12 needs to be performed.

FIG. 16 shows a case in which the peak PK1 of the first pulse P#1 is used as the value A in the same way, but the bottom values BT2 and BT3 of the second pulse P#2 and the third pulse P#3 are used as the value B. A figure showing the structure of a pulse sampling section 25 is omitted. In this case, a bottom holding circuit for the second pulse P#2 and a bottom holding circuit for the third pulse P#3 in addition to a peak holding circuit 25a1 for the first pulse P#1, and A/D converters corresponding thereto need to be provided.

A timing generator 25c outputs signals which specify sampling periods as shown in FIG. 16(d), FIG. 16(e), and FIG. 16(f) to sample the peak PK1 and the bottom values BT2 and BT3.

With this, a sampled-value input section 10a in a system controller 10 receives the peak PK1 and the bottom values BT2 and BT3. The sampled-value input section 10a uses the peak PK1 as the value A, and the bottom values BT2 and BT3 as the value B. Either the bottom value BT2 or the bottom value BT3 may be used as the value B. Alternatively, the average (BT2+BT3)/2 may be used as the value B.

FIG. 17 shows a case in which the peak PK1 of the first pulse P#1 is used as the value A in the same way, but the center values of the second pulse P#2 and subsequent pulses are used as the value B. A figure showing the structure of a pulse sampling section 25 is omitted. In this case, peak holding circuits for the second pulse and subsequent pulses P#2 to P#n, bottom holding circuits for the second pulse and subsequent pulses P#2 to P#n in addition to a peak holding circuit 25a1 for the first pulse P#1, and A/D converters corresponding thereto need to be provided.

A timing generator 25c outputs signals which specify sampling periods as shown in FIG. 17(d), FIG. 17(e), and FIG. 17(f) to sample the peak PK1 and the peak values and bottom values of the second pulse and subsequent pulses P#2 to P#n.

With this, a sampled-value input section 10a in a system controller 10 receives the peak PK1 and the peak and bottom values of the second pulse P#2 and subsequent pulses. The sampled-value input section 10a uses the peak PK1 as the value A, and calculates center values CT(2-n) by dividing the sums of the peak and bottom values of the second pulse P#2 and subsequent pulses by 2 and uses them as the value B.

FIG. 18 shows a case in which the peak PK1 of the first pulse P#1 is used as the value A in the same way, but the average av of all sampled values of the second and subsequent pulses P#2 to P# is used as the value B. A figure showing the structure of a pulse sampling section 25 is omitted. In this case, sampling circuits for the second and subsequent pulses P#2 to P#n in addition to a peak holding circuit 25a1 for the first pulse P#1, and A/D converters corresponding thereto need to be provided.

A timing generator 25c outputs signals which specify sampling periods as shown in FIG. 18(d) and FIG. 18(e) to sample the peak PK1 and amplitudes at intervals of predetermined sampling periods in the zone of the second pulse P#2 to the n-th pulse.

With this, a sampled-value input section 10a in a system controller 10 receives the peak PK1 and the sampled values of the second pulse P#2 and subsequent pulses. The sampled-value input section 10a uses the peak PK1 as the value A, and calculates the average av by dividing the sum of the sampled values of the second pulse P#2 and subsequent pulses by the number of samples and uses it as the value B.

FIG. 19 shows a case in which the peak PK1 of the first pulse P#1 is used as the value A in the same way, but the bottom values of the second and subsequent pulses P#2 to P# are used as the value B. A figure showing the structure of a pulse sampling section 25 is omitted. In this case, bottom holding circuits for the second and subsequent pulses P#2 to P#n in addition to a peak holding circuit 25a1 for the first pulse P#1, and A/D converters corresponding thereto need to be provided.

A timing generator 25c outputs signals which specify sampling periods as shown in FIG. 19(d) and FIG. 19(e) to sample the peak PK1 and bottom values in the zone of the second pulse P#2 to the n-th pulse.

With this, a sampled-value input section 10a in a system controller 10 receives the peak PK1 and the bottom values of the second pulse P#2 and subsequent pulses. The sampled-value input section 10a uses the peak PK1 as the value A, and uses the bottom values of the second pulse P#2 and subsequent pulses as the value B.

As described above, various items can be used as the values A and B used for obtaining the ratio B/A. The center value CT1 or the modulation value (PK1−BT1) of the first pulse P#1 may be used as the value A.

Further various items may be used as the value B, such as the peaks, the bottom values, the center values, the average, or the modulation values (peak−bottom value) corresponding to the second pulse P#2 and subsequent pulses.

The reference ratio (B/A)ref stored in the memory 27 in advance as table data needs to correspond to the values A and B. When the center value CT1 of the first pulse P#1 is used as the value A and the center value CT2 of the second pulse P#2 is used as the value B, for example, a reference ratio (B/A)ref needs to be the most appropriate CT2/CT1 value.

In the embodiment, the disk drive apparatus is the recording and reproduction apparatus which handles DVD-Rs. The disk drive apparatus can also be a recording apparatus which handles other types of recording media.

From the point of view of the operational principle of the present invention, the present invention can be preferably applied to disk drive apparatuses which handle recording media having an organic pigment film, which has a quick mark-generation response to laser illumination. The present invention can also be preferably applied to recording apparatuses which handle not recording media having an organic pigment film but recording media having a quick mark-generation response to laser illumination, that is, recording media in which reflected light includes an effect of generated marks.

The disk drive apparatus 30 shown in FIG. 8 is connected to the host computer 80. An optical recording apparatus according to the present invention can be an apparatus not connected to the host computer 80 or others. In this case, an operation section and a display section are provided and a data input-and-output interface section has a different structure from that shown in FIG. 8. In other words, recording and reproduction needs to be performed according to user's operations, and a terminal section for inputting and outputting various data needs to be formed.

As understood from the above description, according to the present invention, when data is recorded (marks are generated) in an organic-pigment recording medium by pulse-train-manner laser outputs, for example, a first signal value corresponding to a first pulse in the pulse-train-manner laser outputs and a second signal value corresponding to second and subsequent pulses in the pulse-train-manner laser outputs are detected as reflected-light information signals; the ratio thereof is obtained; and a laser-power compensation signal is generated by using the obtained ratio and a reference ratio to control laser output power. This means that a recording state itself, that is, pit mark generation, is observed to compensate laser power. The laser power is compensated to be most appropriate with all environmental conditions (all factors that affect mark generation) at the point of recording being taken into account. More specifically, the laser power is controlled for a change in the energy absorption efficiency of the recording medium caused by wavelength fluctuation due to the temperature dependency of the I-L characteristic of the semiconductor laser or aging, and film unevenness on a surface of the recording medium.

Therefore, the most appropriate mark-generation operation is always implemented, and the quality (jitter and others) of an RF signal is improved when reproduction.

It is preferred in the above-described compensation processing that the peak, the center value, or the modulation value of the reflected-light information signal, corresponding to the first pulse in the pulse-train-manner laser outputs be used as the first signal value, and the peak, the center values, the bottom values, the average, or the modulation values of the reflected-light information signal, corresponding to the whole or part of the second and subsequent pulses in the pulse-train-manner laser outputs be used as the second signal value.

When the most appropriate ratio of the first and second signal values is stored in advance according to each of various conditions related to a recording operation, and a ratio suited to the current condition is selected among the stored ratios and used as the reference ratio, various recording conditions, such as a medium type, a linear velocity, and target laser power, can be appropriately handled.

What is claimed is:

1. An optical recording apparatus for recording data in a recording medium, comprising:
    recording processing means for applying encoding processing to data to be recorded to generate encoded data and for generating laser driving pulses used for executing pulse-train-manner laser outputs, according to the encoded data;
    recording-head means for emitting the laser outputs to the recording medium according to the laser driving pulses to execute data recording;
    reflected-light information signal detection means for detecting a reflected-light information signal obtained when the recording-head means emits the laser outputs;
    signal-value detection means for detecting a first signal value corresponding to a first pulse in the pulse-train-manner laser outputs and a second signal value corresponding to second and subsequent pulses in the pulse-train-manner laser outputs, in the reflected-light information signal detected by the reflected-light information signal detection means;
    calculation means for obtaining the ratio of the first and second signal values detected by the signal-value detection means and for generating a laser-power compensation signal by using the obtained ratio and a reference ratio; and
    laser-power control means for controlling the power of the laser outputs according to the laser-power compensation signal sent from the calculation means.

2. An optical recording apparatus according to claim 1, wherein the recording medium has an organic pigment film as a recording layer.

3. An optical recording apparatus according to claim 1, wherein the first signal value is the peak, the center value, or the modulation value of the reflected-light information signal, corresponding to the first pulse in the pulse-train-manner laser outputs.

4. An optical recording apparatus according to claim 1, wherein the second signal value is the peak, the center value, the bottom value, the average, or the modulation value of the reflected-light information signal, corresponding to the whole or a part of the second and subsequent pulses in the pulse-train-manner laser outputs.

5. An optical recording apparatus according to claim 1, wherein the calculation means stores in advance the most appropriate ratio of the first and second signal values according to each of various conditions related to a recording operation, and selects a ratio suited to the current condition among the stored ratios to use it as the reference ratio.

6. A laser-power control method for an optical recording apparatus which applies pulse-train-manner laser outputs to a recording medium having an organic pigment film to record data, comprising
    detecting a first signal value corresponding to a first pulse in the pulse-train-manner laser outputs and a second signal value corresponding to second and subsequent pulses in the pulse-train-manner laser outputs, in a reflected-light information signal obtained during laser outputs;
    obtaining the ratio of the first and second signal values detected;
    generating a laser-power compensation signal by using the obtained ratio and a reference ratio; and
    controlling the power of the laser outputs according to the laser-power compensation signal.

7. A laser-power control method according to claim 6, wherein the first signal value is the peak, the center value, or the modulation value of the reflected-light information signal, corresponding to the first pulse in the pulse-train-manner laser outputs.

8. A laser-power control method according to claim 6, wherein the second signal value is the peak, the center value, the bottom value, the average, or the modulation value of the reflected-light information signal, corresponding to the whole or a part of the second and subsequent pulses in the pulse-train-manner laser outputs.

9. A laser-power control method according to claim 6, wherein the most appropriate ratio of the first and second signal values is stored in advance according to each of various conditions related to a recording operation, and a ratio suited to the current condition is selected among the stored ratios and used as the reference ratio.

10. An optical recording apparatus for recording data in a recording medium, comprising:
    a laser driving driver for generating laser driving pulses used for executing pulse-train-manner laser outputs, according to data to be recorded;
    a recording head for emitting the laser outputs to the recording medium according to the laser driving pulses to execute data recording;
    a reflected-light information signal detector for detecting a reflected-light information signal obtained from the recording medium when the recording head emits the laser outputs;
    a signal-value detection circuit for detecting a first signal value corresponding to a first pulse in the pulse-trainmanner laser outputs and a second signal value corresponding to second and subsequent pulses in the pulse-train-manner laser outputs, in the reflected-light information signal detected by the reflected-light information signal detector;

a calculation circuit for comparing a value obtained by a calculation from the first and second signal values detected by the signal-value detection circuit with a reference value to generate a laser-power compensation signal; and a laser-power controller for controlling the power of the laser outputs according to the laser-power compensation signal sent from the calculation means.

11. An optical recording apparatus according to claim 10, wherein the recording medium has an organic pigment film as a recording layer.

12. An optical recording apparatus according to claim 10, wherein the first signal value is the peak, the center value, or the modulation value of the reflected-light information signal, corresponding to the first pulse in the pulse-train-manner laser outputs.

13. An optical recording apparatus according to claim 10, wherein the second signal value is the peak, the center value, the bottom value, the average, or the modulation value of the reflected-light information signal, corresponding to the whole or a part of the second and subsequent pulses in the pulse-train-manner laser outputs.

14. An optical recording apparatus according to claim 10, wherein the calculation circuit stores in advance the most appropriate ratio of the first and second signal values according to each of various conditions related to a recording operation, and selects a ratio suited to the current condition among the stored ratios to use it as the reference ratio.

* * * * *

UNITED STATES PATENT AND TRADEMARK OFFICE
CERTIFICATE OF CORRECTION

PATENT NO. : 6,967,914 B2 Page 1 of 1
APPLICATION NO. : 10/333000
DATED : November 22, 2005
INVENTOR(S) : Toshiki Udagawa et al.

It is certified that error appears in the above-identified patent and that said Letters Patent is hereby corrected as shown below:

Title page,
Item [86], § 371 (c)(1), (2), (4) Date, change "Jul. 31, 2002" to -- Jul. 31, 2003 --.

Column 6,
Line 33, change "P#" to -- P#1 --.

Column 8,
Line 52, change "laser" to -- later --.

Column 17,
Line 16, change "in stead" to -- instead --.

Signed and Sealed this

Twenty-seventh Day of June, 2006

JON W. DUDAS
*Director of the United States Patent and Trademark Office*